United States Patent [19]
Moisin

[11] Patent Number: 5,821,699
[45] Date of Patent: Oct. 13, 1998

[54] BALLAST CIRCUIT FOR FLUORESCENT LAMPS

[75] Inventor: Mihail Moisin, Lake Forest, Ill.

[73] Assignee: Pacific Scientific, Newport Beach, Calif.

[21] Appl. No.: 488,387

[22] Filed: Jun. 6, 1995

Related U.S. Application Data

[63] Continuation-in-part of Ser. No. 451,835, May 26, 1995, abandoned, and a continuation-in-part of Ser. No. 449,786, May 24, 1995, abandoned, and a continuation-in-part of Ser. No. 316,395, Sep. 30, 1994, abandoned.

[51] Int. Cl.$^6$ ..................................................... H05B 37/02
[52] U.S. Cl. ...................... 315/291; 315/224; 315/DIG. 4
[58] Field of Search ............................... 315/DIG. 4, 307, 315/291, 224, 205

[56] References Cited

U.S. PATENT DOCUMENTS

| | | |
|---|---|---|
| 2,505,112 | 7/1950 | Hallman . |
| 2,966,602 | 12/1960 | Waymouth et al. . |
| 3,112,890 | 12/1963 | Snelling . |
| 3,507,259 | 4/1970 | Dotto . |
| 3,569,817 | 3/1971 | Boehringer . |

(List continued on next page.)

FOREIGN PATENT DOCUMENTS

| | | |
|---|---|---|
| 0441253 | 8/1991 | European Pat. Off. . |
| WO9000830 | 1/1990 | WIPO . |
| WO9009729 | 8/1990 | WIPO . |
| WO9309649 | 5/1993 | WIPO . |
| 9427420 | 11/1994 | WIPO . |

OTHER PUBLICATIONS

Kröning, et al., "New Electronic Control Gear," *Siemens Power Engineering & Automation VII*, No. 2, pp. 102–104, 1985.

Hayt, et al., *Engineering Circuit Analysis,* 3d ed., pp. 296–297, 1978.

OSRAM DELUX® compact fluorescent lamps, "Economical long–life lighting—with extra convenience of electronic control gear", pp. 1–15.

Philips Lighting, "Lamp specification and application guide", pp. 1, 11, 61–64, 78.

*Primary Examiner*—Robert Pascal
*Assistant Examiner*—Michael Shingleton
*Attorney, Agent, or Firm*—Knobbe, Martens, Olson & Bear LLP

[57] ABSTRACT

An improved ballast circuit for use with a compact fluorescent lamp includes an EMI filter, a rectifier and a voltage amplification stage, an active resonant circuit, a dimming circuit, and a power factor correction stage which is connected in parallel to a lamp load. In one embodiment, the ballast circuit operates in cooperation with a three way switch to adjust the light output of the lamp to three discrete levels corresponding to each setting of the three way switch. In another embodiment the ballast circuit includes a feedback capacitor which provides a feedback path for a portion of the high frequency current to the rectifier and voltage amplification stage. In still another embodiment, the ballast circuit is configured to accept input from a triac or a SCR device. In all of the embodiments, the dimming circuit works with the active resonant circuit to vary the amount of power that is supplied to the lamp load. Further, the ballast circuit embodiments automatically limit the voltage buildup in the lamp filaments at the end of their lifetime to prevent catastrophic failure of fluorescent and compact fluorescent lamps.

11 Claims, 18 Drawing Sheets

U.S. PATENT DOCUMENTS

| | | |
|---|---|---|
| 3,611,021 | 10/1971 | Wallace . |
| 3,736,496 | 5/1973 | Lachocki . |
| 3,882,356 | 5/1975 | Stehlin . |
| 3,913,000 | 10/1975 | Cardwell, Jr. . |
| 3,974,418 | 8/1976 | Fridrich . |
| 4,005,334 | 1/1977 | Andrews . |
| 4,016,451 | 4/1977 | Engel . |
| 4,053,813 | 10/1977 | Cornrumpf et al. . |
| 4,125,767 | 11/1978 | Silver . |
| 4,127,795 | 11/1978 | Knoll . |
| 4,127,798 | 11/1978 | Anderson . |
| 4,135,116 | 1/1979 | Smith . |
| 4,160,288 | 7/1979 | Stuart et al. . |
| 4,168,453 | 9/1979 | Gerhard et al. . |
| 4,230,971 | 10/1980 | Gerhard et al. . |
| 4,237,403 | 12/1980 | Davis . |
| 4,245,285 | 1/1981 | Weiss . |
| 4,284,925 | 8/1981 | Bessone et al. . |
| 4,348,615 | 9/1982 | Garrison et al. . |
| 4,350,891 | 9/1982 | Wuerflein . |
| 4,353,009 | 10/1982 | Knoll . |
| 4,370,600 | 1/1983 | Zansky . |
| 4,379,254 | 4/1983 | Hurban . |
| 4,388,563 | 6/1983 | Hyltin . |
| 4,392,087 | 7/1983 | Zansky . |
| 4,393,323 | 7/1983 | Huebner . |
| 4,395,660 | 7/1983 | Waszkiewicz . |
| 4,399,391 | 8/1983 | Hammer et al. . |
| 4,423,348 | 12/1983 | Greiler . |
| 4,443,740 | 4/1984 | Goralnik . |
| 4,481,460 | 11/1984 | Kröning et al. . |
| 4,510,400 | 4/1985 | Kitely . |
| 4,523,131 | 6/1985 | Zansky . |
| 4,533,986 | 8/1985 | Jones . |
| 4,544,863 | 10/1985 | Hashimoto . |
| 4,547,706 | 10/1985 | Krummel . |
| 4,562,383 | 12/1985 | Kerscher et al. . |
| 4,580,080 | 4/1986 | Smith . |
| 4,612,479 | 9/1986 | Zansky . |
| 4,613,934 | 9/1986 | Pacholok . |
| 4,616,158 | 10/1986 | Krummel et al. . |
| 4,620,271 | 10/1986 | Musil . |
| 4,626,746 | 12/1986 | Zaderej . |
| 4,631,450 | 12/1986 | Lagree et al. . |
| 4,641,061 | 2/1987 | Munson . |
| 4,647,817 | 3/1987 | Fähnrich et al. . |
| 4,651,060 | 3/1987 | Clark . |
| 4,677,345 | 6/1987 | Nilssen . |
| 4,682,083 | 7/1987 | Alley . |
| 4,683,402 | 7/1987 | Aubrey . |
| 4,700,113 | 10/1987 | Stupp et al. . |
| 4,730,147 | 3/1988 | Kroening . |
| 4,739,227 | 4/1988 | Anderson . |
| 4,742,535 | 5/1988 | Hino et al. . |
| 4,743,835 | 5/1988 | Bossé et al. . |
| 4,857,806 | 8/1989 | Nilssen . |
| 4,859,914 | 8/1989 | Summa . |
| 4,864,482 | 9/1989 | Quazi et al. . |
| 4,894,587 | 1/1990 | Jungreis et al. . |
| 4,933,605 | 6/1990 | Quazi et al. . |
| 4,943,886 | 7/1990 | Quazi et al. . |
| 4,949,020 | 8/1990 | Warren et al. . |
| 4,950,963 | 8/1990 | Sievers . |
| 4,954,768 | 9/1990 | Luchaco et al. . |
| 4,963,795 | 10/1990 | Nilssen ................................. 315/205 |
| 4,988,921 | 1/1991 | Ratner et al. . |
| 4,996,462 | 2/1991 | Krummel . |
| 4,999,547 | 3/1991 | Ottenstein . |
| 5,001,386 | 3/1991 | Sullivan et al. . |
| 5,003,230 | 3/1991 | Wong et al. . |
| 5,004,959 | 4/1991 | Nilssen . |
| 5,004,997 | 4/1991 | Roth . |
| 5,039,914 | 8/1991 | Szuba . |
| 5,041,763 | 8/1991 | Sullivan et al. . |
| 5,083,081 | 1/1992 | Barrault et al. . |
| 5,084,653 | 1/1992 | Nilssen . |
| 5,089,751 | 2/1992 | Wong et al. . |
| 5,097,181 | 3/1992 | Kakitani . |
| 5,101,142 | 3/1992 | Chatfield ........................ 315/DIG. 4 |
| 5,172,033 | 12/1992 | Smits . |
| 5,172,034 | 12/1992 | Brinkerhoff . |
| 5,173,643 | 12/1992 | Sullivan et al. . |
| 5,174,646 | 12/1992 | Siminovitch et al. . |
| 5,175,477 | 12/1992 | Grissom . |
| 5,185,560 | 2/1993 | Nilssen . |
| 5,192,896 | 3/1993 | Qin . |
| 5,194,782 | 3/1993 | Richardson et al. . |
| 5,198,726 | 3/1993 | Van Meurs et al. . |
| 5,214,356 | 5/1993 | Nilssen . |
| 5,233,270 | 8/1993 | Nilssen . |
| 5,237,243 | 8/1993 | Chung . |
| 5,245,253 | 9/1993 | Quazi . |
| 5,289,079 | 2/1994 | Wittmann . |
| 5,289,083 | 2/1994 | Quazi . |
| 5,296,783 | 3/1994 | Fischer . |
| 5,309,062 | 5/1994 | Perkins et al. . |
| 5,313,142 | 5/1994 | Wong . |
| 5,321,337 | 6/1994 | Hsu . |
| 5,331,253 | 7/1994 | Counts . |
| 5,341,067 | 8/1994 | Nilssen . |
| 5,394,064 | 2/1995 | Ranganath et al. . |
| 5,396,154 | 3/1995 | Shiy et al. . |
| 5,396,155 | 3/1995 | Bezdon et al. . |
| 5,404,082 | 4/1995 | Hernandez et al. . |

BALLAST CIRCUIT FOR FLUORESCENT LAMPS

RELATED APPLICATIONS

The present application is a continuation-in-part of U.S. patent application Ser. No. 08/451,835, filed on May 26, 1995 (abandoned), and a continuation-in-part of U.S. patent application Ser. No. 08/449,786, filed on May 24, 1995 (abandoned), and a continuation-in-part of U.S. patent application Ser. No. 08/316,395, filed on Sep. 30, 1994 (abandoned).

BACKGROUND OF THE INVENTION

1. Field of the Invention

The present invention relates to improved apparatus and methods for operating fluorescent lamps. Improvements are described which prevent catastrophic failures of fluorescent lamps. Other improvements relate to controlling fluorescent lamps in response to the output from a conventional SCR (semiconductor controlled rectifier) or incandescent lamp dimmer control or triac or from a conventional three position light dimmer switch.

2. Description of the Prior Art

Fluorescent lamps are a conventional type of lighting device which are gas charged devices that provide illumination as a result of atomic excitation of low-pressure gas, such as mercury, within a lamp envelope. The excitation of the mercury vapor atoms is provided by means of a pair of arc electrodes mounted within the lamp. In order to properly excite the mercury vapor atoms, the lamp is ignited and operated at a relatively high voltage, and at a relatively constant current. The excited atoms emit invisible ultraviolet radiation. The invisible ultraviolet radiation in turn excites a fluorescent material, e.g., phosphor, that is deposited on an inside surface of the fluorescent lamp envelope, thus converting the invisible ultraviolet radiation to visible light. The fluorescent coating material is selected to emit visible radiation over a wide spectrum of colors and intensities.

As is known to those of skill in the art, a ballast circuit is commonly disposed in electrical communication with the lamp to provide the elevated voltage levels and constant current required for fluorescent illumination. Typical ballast circuits electrically connect the fluorescent lamp to line alternating current and convert this alternating current provided by the power transmission lines to the constant current and voltage levels required by the lamp.

Fluorescent lamps have substantial advantages over conventional incandescent lamps. In particular, the fluorescent lamps are substantially more efficient and typically use 80 to 90% less electrical power than an equivalent light for output incandescent lamps.

For these reasons, these lamps have been widely used in a number of applications, especially in commercial buildings where the unusual shape and size (in contrast to incandescent bulbs) is either not a disadvantage or is actually an advantage.

In view of the significant advantages of the fluorescent tubes, it would seem to be a natural to largely replace use of the incandescent lamp in the home environment, especially now that compact fluorescent tubes are available.

However, to date, these lamps have several serious disadvantages which have limited their use. These disadvantages include:

1. The ballast circuit unlike an incandescent bulb, presents a non-linear load to the ac line. Typically the power factor which measures the phase relationship of the current and voltage of a conventional ballast circuit is about 0.4 which is an undesirable level. One prior solution to the ballast circuit problem is to employ an electronic ballast circuit which electrically is more efficient. However, these ballast circuits require a large number of electrical components which increases the cost of the fluorescent lamp. Further, the addition of these electrical components cause harmonic distortion problems and provide a lower than desired power factor.

2. Fluorescent lamps have been relatively large, both because of the lamp itself but also because of the space required to house the ballast circuit. As a result, contemporary fluorescent lamps cannot readily replace many incandescent lamps used in the home and elsewhere.

3. Dimmable fluorescent lamps suffer from a number of compromises. Common problems are flickering and striations, e.g., alternating bands of illumination and non-illumination across the fluorescent lamps, in the dimmed conditions, uneven non-gradual dimming, a small range of dimming, and high cost of the dimming circuit.

4. Conventional ballasts emit unacceptable levels of electromagnetic interference (EMI) and radio-frequency interference (RFI). The high levels of interference often make the fluorescent lamp unacceptable near radios, televisions, personal computers and the like.

5. Although the fluorescent tube itself has a very long life, the ballast, particularly ballasts capable of dimming the fluorescent tube, have suffered from excessive failures in the field. In addition, many dimmable fluorescent lamp ballasts suffer catastrophic failure if the ballast is plugged into line voltage without a fluorescent tube in the circuit.

6. Some prior art ballast circuits require a large ferrite core inductor to be placed between the lamp and the input power circuit to provide a selected degree of electrical isolation between the power transmission lines at the input and the lamp, while allowing the conduction of the necessary current levels to the fluorescent lamp. Despite the fact that these ballast circuits provide the desired current and voltage levels they do so at the price of the electrical efficiency of the ballast circuit.

7. In compact fluorescent lamps, near the end of their lifetime the impedance of the fluorescent lamp increases as the filament breaks down, causing a rapid build up of voltage in the lamp. This voltage buildup may trigger a catastrophic failure of the lamp, which, in extreme cases, results in an explosion within the lamp and the broadcast of shards of glass for several feet.

8. The prior art ballast circuits do not provide three discrete levels of light intensity when attached to a traditional three way switch.

9. Traditional fluorescent light ballasts are not practical for use with conventional triac or SCR dimmer controls. For example, the triac or SCR creates problems of flickering at low light levels. Furthermore, the uneven power which the triac or SCR delivers causes problems with starting the fluorescent lamp at low power levels.

SUMMARY OF THE INVENTION

The present invention comprises a ballast circuit for a compact fluorescent lamp that provides notable advantages in the field of fluorescent and compact fluorescent lamps, including (a) changing the light intensity output of a compact fluorescent bulb in response to each change in position of a three way switch (b) eliminating the problem of a destructive breakdown of the lamp due to voltage building in the lamp towards the end of the lamps lifetime, (c) achieving a very high level of power correction, (d) providing a dramatically improved variable dimming capability and (e) providing compatibility with SCR and triac power control devices. The variable dimming capability combined with the three discrete intensity settings of the three way switch provides flexibility to the user in adjusting light output of the fluorescent lamp. The ballast circuit also has a high electrical efficiency and a high power factor rating.

One embodiment of the improved ballast circuit of the present invention preferably comprises an EMI filter, a rectifier and voltage amplification stage, an active resonant circuit and power factor correction stage which is connected in parallel to a lamp load and a feedback element and a dimming circuit to enable a full range of variable adjustment of the level of brightness of the fluorescent lamp, i.e., from 0% to 100% light output.

In another embodiment, the ballast circuit is designed to accommodate three input lines, each of the lines corresponding to the three output lines of a traditional three way switch. This embodiment uses all of the stages of the first embodiment, along with additional elements to transfer the information on the three lines to the amplification and dimming control stage of the ballast circuit and adjust the power delivered to the compact fluorescent lamp accordingly.

A significant feature of the present invention is that the adverse effects and problems found in the prior art are either eliminated or reduced to such low levels as to make the present invention essentially "plug-to-plug" compatible with the incandescent lamp but with all of the attendant advantages of the fluorescent tubes. Thus, as indicated above the power factor typically associated with compact fluorescent lamps of the prior art is in the range of about 0.4–0.6 which is an undesirable level. In the present invention, the power factor correction is much higher, e.g., on the order of 95% or greater. In one embodiment this is achieved by a feedback path for a portion of the high frequency current from the lamp's load to the rectifier and voltage amplification stage. This feedback path has been found to substantially compensate for the non-linear characteristic of the rectifier diodes.

By eliminating the nonlinearities of the diodes, the ballast circuit appears as an almost linear load at the input voltage interface, thus achieving the very high level of power factor correction.

The ballast circuit provides a dramatically improved dimming capability. In one embodiment, this is achieved by including an improved dimmer control circuit to enable variable adjustment of the level of brightness of the fluorescent lamp. The dimmer control circuit preferably controls the operation of a second switching transistor in the active resonant circuit to suppress the operation of the second switching transistor during a portion of the conductive cycle of the second switching transistor to operate asymmetrically, thus providing a lower average power to the fluorescent lamp to dim its output.

In another embodiment, the ballast circuit adjusts the dimming based on the output of a three line, three position switch. The ballast controls the level of brightness in response to a change in switch setting by adjusting the amplification of the input voltage being delivered to the load. The ballast also, in response to a change in switch setting, changes the level of brightness of the lamp by controlling the operation of the second switching transistor during a portion of the conductive cycle of the second switching transistor to operate asymmetrically, thus providing a lower average power to the fluorescent lamp to dim its output. Ballast circuits constructed in accordance with the preferred embodiment of the invention achieve three different levels of dimming of the fluorescent lamp.

A further significant feature of the dimmable ballast circuit described above is that it requires only one single active stage to perform all the necessary functions of a ballast circuit, including lamp start-up, lamp driving operations, and local dimming of the lamp. The streamlined circuit design also provides for high electrical efficiency of the operating circuit because of the lack of additional parasitic active stages. Further, as indicated above the resonant circuit provides for low total harmonic distortion and for high power factor correction, for example, achieving a power factor of greater than 0.95.

Another significant feature of the dimmable ballast circuit is that it serves to automatically prevent destructive breakdown of the compact fluorescent lamp by limiting the voltage buildup in the lamp as the lamp impedance increases over its useful life. As a result, the dimmable ballast circuit operates to limit the voltage applied to the lamp to prevent a destructive breakdown.

A further significant feature of an embodiment of the dimmable ballast circuit is that it allows the fluorescent lamp to work with an output from a triac or a SCR device with minimal flickering problems and a wider range of lamp start-up.

An additional feature of the invention is an improved output stage which incorporates a section of the resonant inductor in parallel with the fluorescent lamp. This improved output stage compensates for changes in the resonant frequency to maintain approximately constant voltage across the load despite changes in frequency. This stage also permits the useful dimming range to be extended since it provides for restriking the lamp at very low dimming levels.

BRIEF DESCRIPTION OF THE DRAWINGS

The foregoing and other objects, features, and advantages of the invention will be apparent from the following description and from the accompanying drawings, in which like reference numerals refer to the same parts throughout the different views.

DETAILED DESCRIPTION OF THE DIFFERENT EMBODIMENTS OF THE INVENTION

The Compact Screw-In Fluorescent Lamp 10

Figure 1:
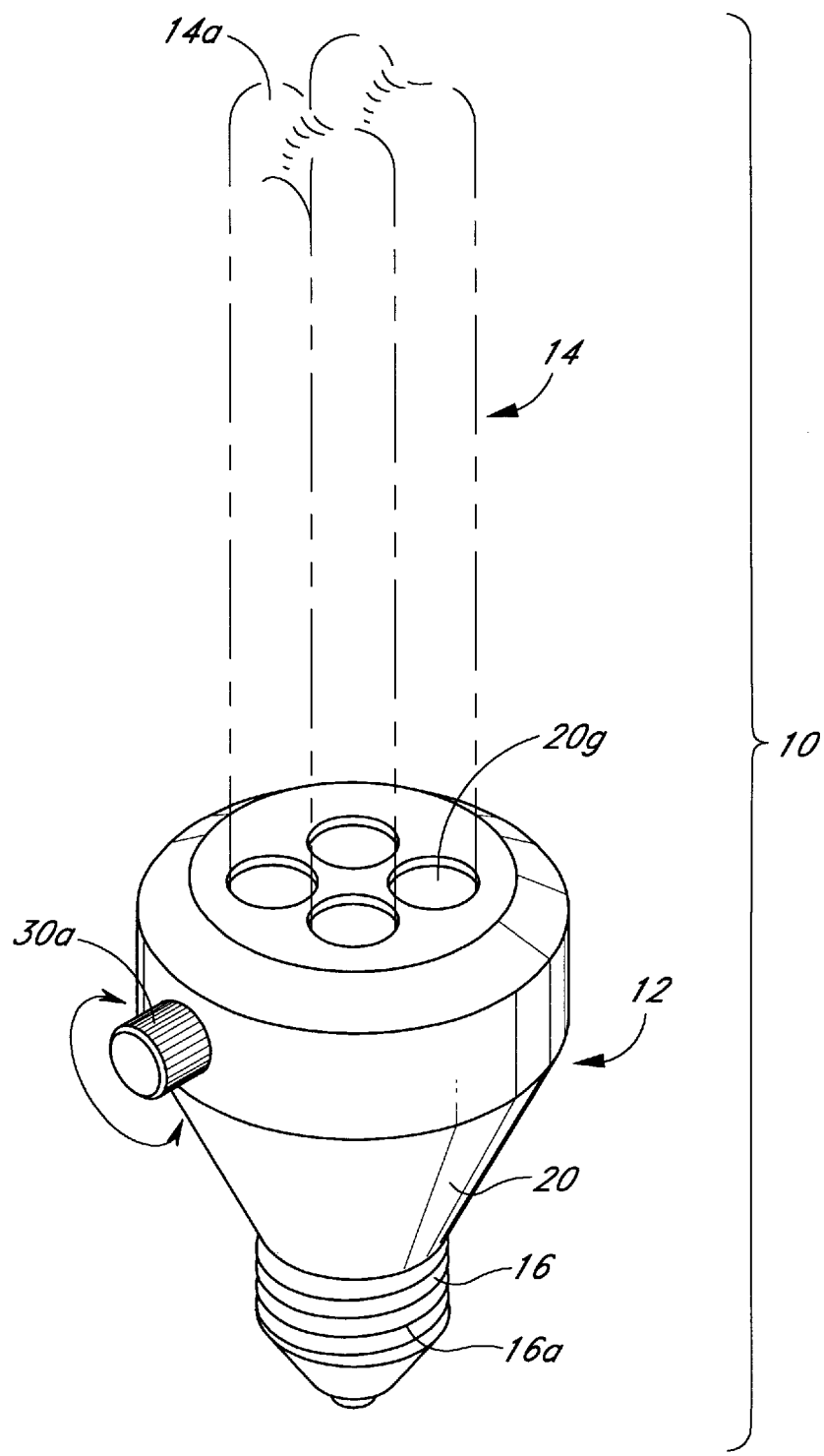
FIG. 1 is a perspective view of a dimmable compact screw-in fluorescent lamp apparatus constructed in accordance with this present invention.
Figure 2:
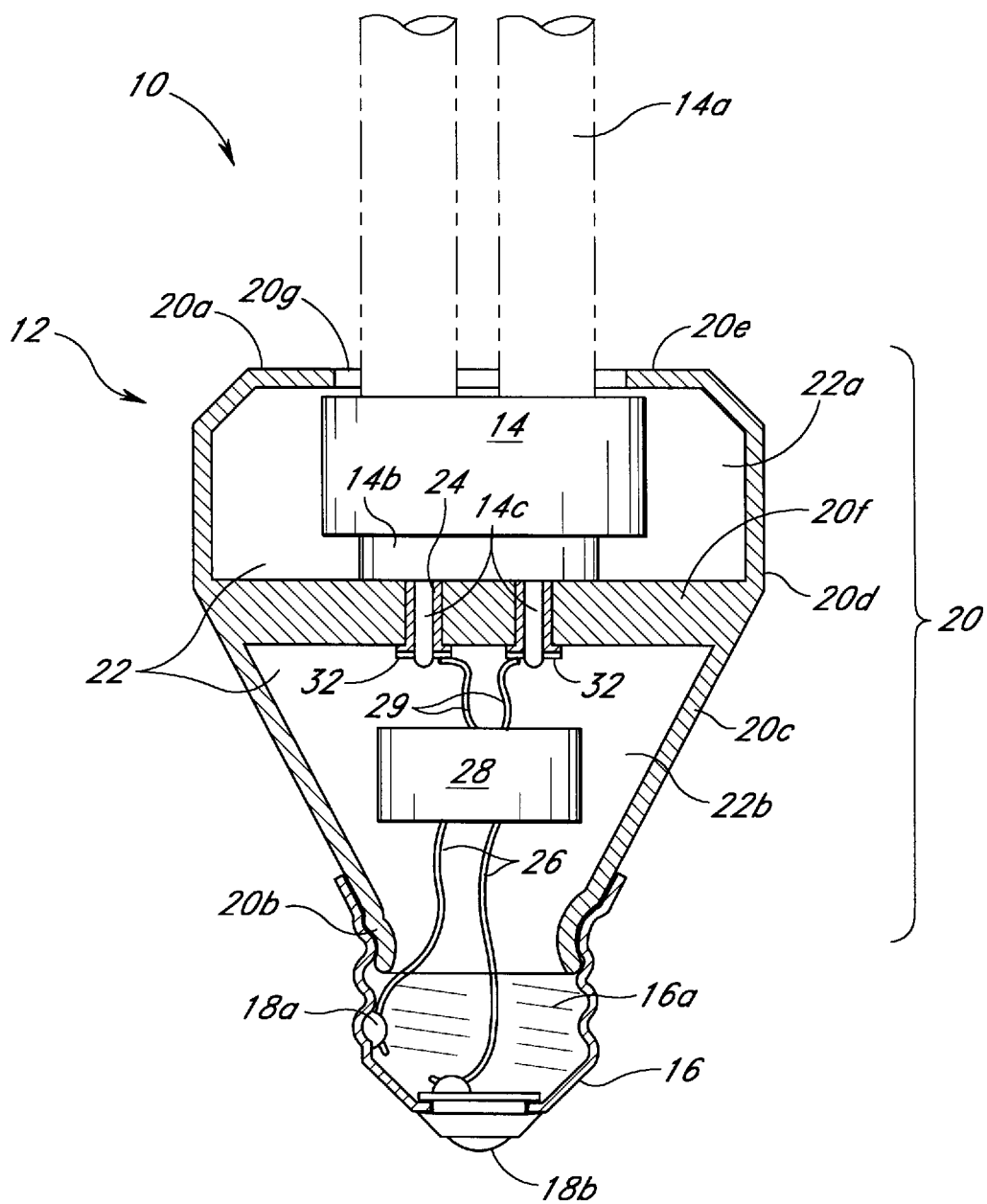
FIG. 2 is a side elevational view, partly in section, of a compact lamp apparatus according to the embodiment in FIG. 1.

Referring to FIGS. 1 and 2, a compact screw-in fluorescent lamp 10 including a lamp base 12 that supports at one end a fluorescent lamp tube element 14. The fluorescent lamp element 14 comprises at least one fluorescent tube 14a, a base portion 14b and electrical contacts 14c. The opposite end of the lamp base 12 supports a conventional electrical screw-in socket 16 which includes threads 16a for threaded engagement with a conventional electrical lamp socket 16. This electrical socket 16 typically includes two electrical conductors 18a and 18b arranged for electrical connection with the corresponding conductors on the electrical lamp socket. As is conventional for fluorescent lamps, the electrical conductors 18a and 18b are located at the side and the bottom, respectively, of the socket 16.

The base 12 further includes an electrically insulative housing 20 having a top end 20a axially spaced from the bottom end 20b. The illustrated housing 20 has a generally overall conical or triangular shape which is narrow at the bottom end 20b and wider at the top end 20a. The housing 20 includes funnel-like portion 20c above the bottom end 20b and below a cylindrical portion 20d. It will be understood that the housing 20 can have other cross-sectional configurations, such as for example, circular, ellipsoid, rectangular or triangular. The illustrated portion 20d has a cylindrical wall and is bound at the top by flat wall 20e and at the bottom by interior panel 20f which spans the interior space 20 traverse to the longitudinal axis of the housing 20. The housing 20 thus bounds a hollow interior space 22 partitioned into an upper interior space 22a and a lower interior space 22b by the interior panel 20f. The base 16 is secured to the housing 20 at the bottom end 20b of the housing 20 to form the bottom of the adaptor 12.

The compact fluorescent lamp apparatus further includes a removable and replaceable fluorescent tube illumination element 14. In the embodiment shown, the fluorescent lamp tube element removably and replaceably plugs into a socket-like lamp supporting element comprising interior panel 20f via socket connectors 32. The base portion 14b of the fluorescent lamp tube element 14 seats on the top face of panel 20f and sits within openings 20g in the top wall 20e of the housing 20. Electrical contacts 14c extend through the openings 24 in the panel 20f to removably and replaceably plug into connective socket connectors 32, thereby forming electrical connection between the illumination element 14 and the adaptor 12. In an alternative embodiment not shown, the fluorescent lamp tube element is permanently affixed to the housing 20 so that the entire fixture of FIG. 1 is sold and used as an integral unit.

A circuit housing 28 which contains a ballast circuit 40 of FIG. 3, as described in more detail below, is mounted within the housing 20 illustratively in the lower interior space 22b. Input electrical conductors 26 of the circuit housing 28 connect respectively to the electrical connector 18a and 18b of the socket base 16. The connection of the ballast circuit within the ballast circuit housing 28 applies an excitation current and voltage to the illumination element 14. Output conductors 29 from the ballast circuit housing 28 electrically connect to the electrical contacts 14c of the fluorescent illumination element 14 via the socket connections 32.

Ballast Circuit 40—Simplified Block Diagram

Figure 3:
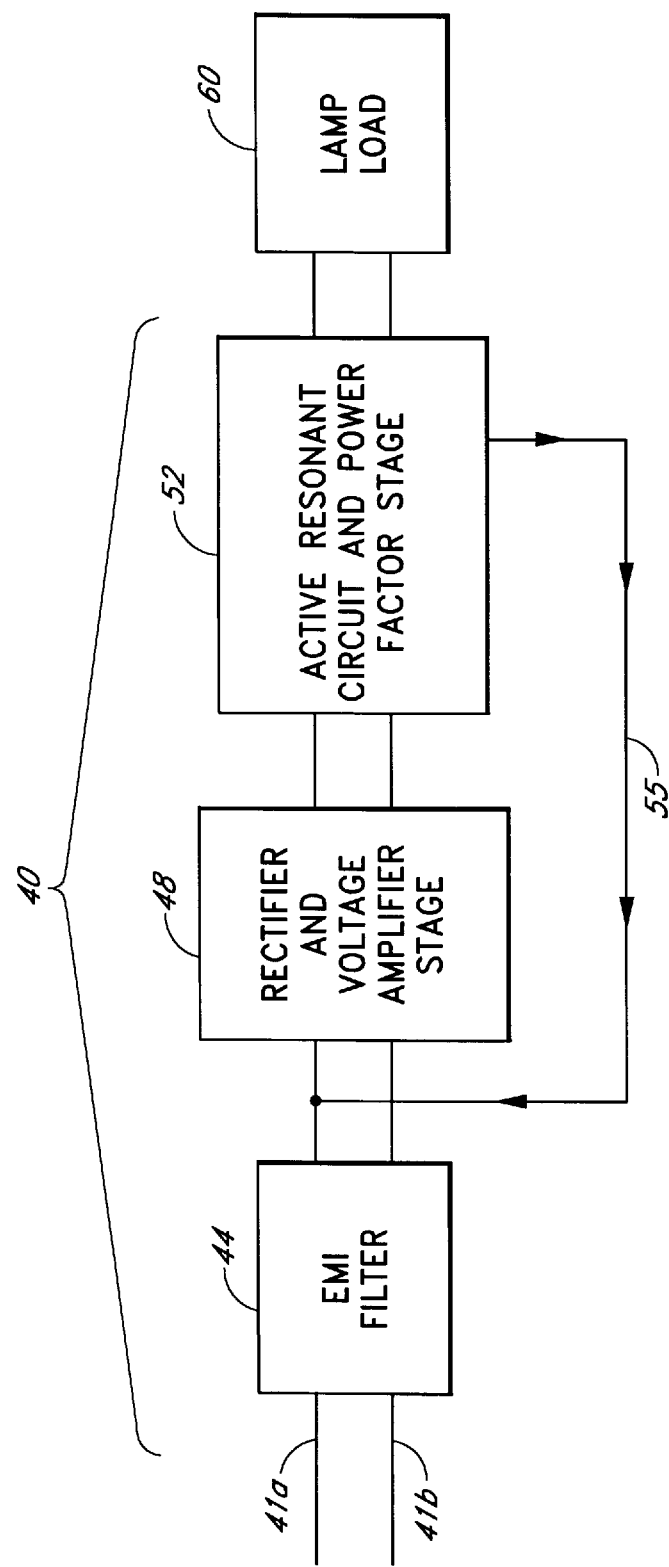
FIG. 3 is a block diagram of a ballast circuit constructed in accordance with this invention for use with the compact lamp apparatus of FIG. 1.

FIG. 3 is a block diagram illustration of a ballast circuit 40 and a fluorescent lamp load 60 in accordance with one embodiment of the present invention. The illustrated ballast circuit 40 is advantageously mounted in the lower interior lamp space 22a preferably within the ballast circuit housing 28 of FIG. 1. The ballast circuit 40 includes an EMI filter stage 44, a rectification and voltage amplification stage 48 and a resonant circuit and power factor correction stage 52, which are connected to a lamp load 60, as shown. The lamp load 60 corresponds to the fluorescent tubes 14a, FIG. 1. The input ac source is connected to the high and low voltage lines 41A and 41B, respectively, which are in turn connected electrically in series with the EMI filter stage 44. The outputs of the EMI filter stage 44 are connected to an input of the rectifier and voltage amplification stage 48. Outputs of the rectifier and voltage amplification stage 48 are connected to respective inputs of the resonant circuit stage 52. The output of the resonant circuit 52 is connected, power wise, in series with the lamp load 60. Further, the resonant circuit 52 generates a high frequency voltage feedback signal on line 55 that is electrically connected to the respective inputs of the voltage amplification stage 48. The ballast circuit 40 has several significant features. The EMI filter stage substantially alternates feedback of electromagnetic interference and the ac input line. The feedback signal on the line 55 may substantially reduce the nonlinearities of the load presented to the ac line. As described below with reference to FIG. 4, these and other features provide an entirely practical compact fluorescent lamp which retains all of the advantages of the fluorescent lamp without the significant disadvantages of prior art ballast stages.

Ballast Circuit 40—Detailed Circuit Schematic

Figure 4:
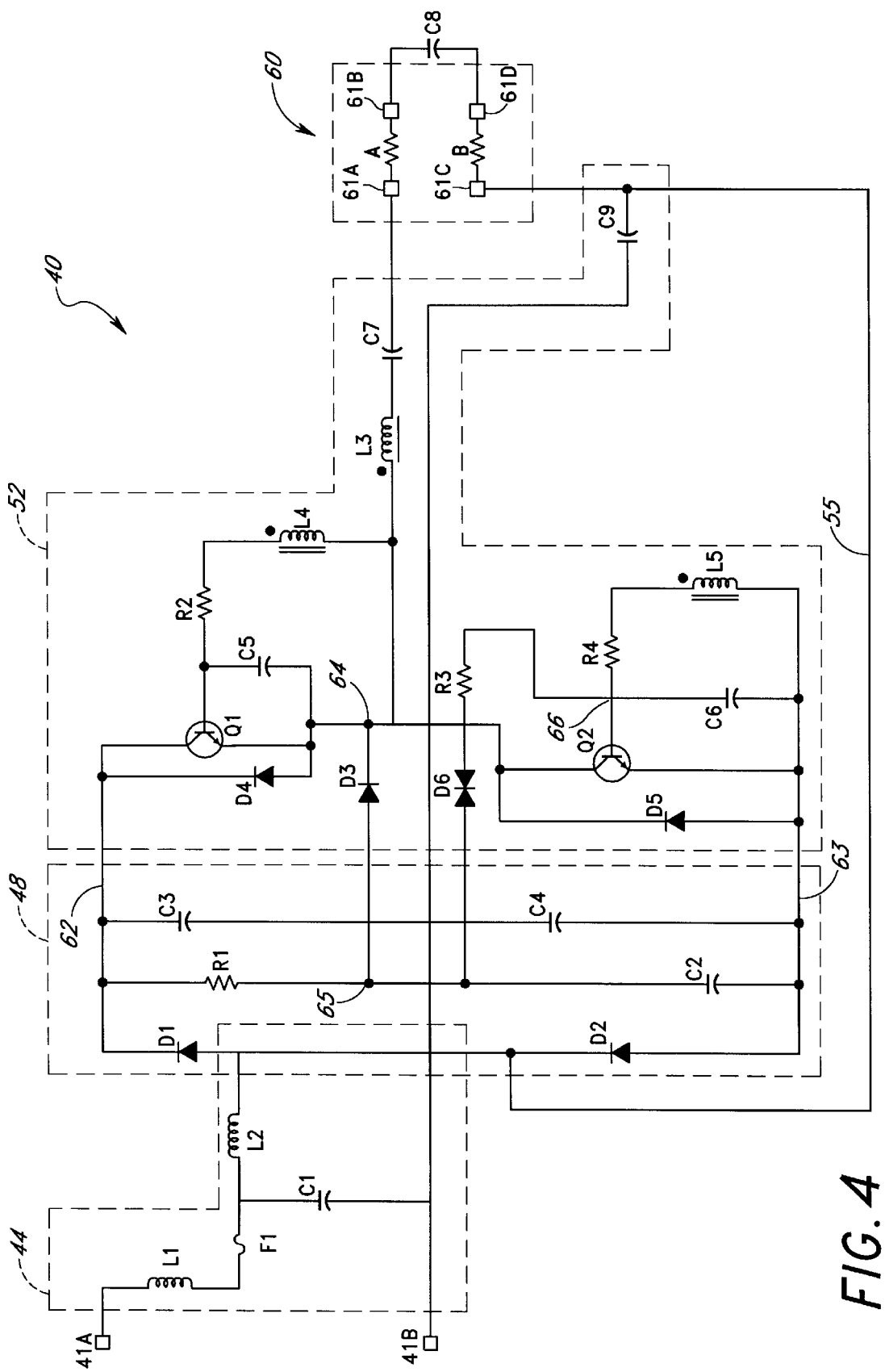
FIG. 4 is a schematic circuit diagram of the ballast circuit of FIG. 3.

FIG. 4 illustrates a detailed circuit schematic of the ballast circuit 40.

EMI Filter Stage 44

The EMI filter stage 44 includes a series inductor L1, a fuse F1, a parallel capacitor C1 and a high frequency blocking inductor L2. The EMI filter stage is connected to the ac input voltage source (not shown) via the high and low voltage input lines 41A and 41B, respectively. The inductor L1 is connected electrically in series with the fuse F1, which in turn is connected to one end of the parallel capacitor C1. The opposite end of the capacitor C1 is connected to the low voltage input line 41B, also referred to as the neutral rail. The LC filter formed by inductor L1 and capacitor C1 ensure a smooth input waveform to the voltage amplification stage 48 by preventing interference with other electronic devices, as is known in the art. The coupled series inductor L2 prevents leakage of unwanted high frequency interference back into the power transmission lines. The fuse F1 protects the ballast circuit 40 and lamp load 60 from damage due to over currents from the input power lines.

In a specific embodiment, the components of the EMI filter stage have the following values: the series inductor L1 is approximately 2.7 mH, the fuse F1 is approximately a 1 Amp fuse, the parallel capacitor C1 is approximately 0.16 $\mu$F and the high frequency blocking inductor L2 is approximately 4.7 mH.

The Rectification and Voltage Amplification Stage 48

Stage 48 converts the input ac voltage to a dc voltage and amplifies the magnitude of this dc voltage to the level necessary to start or ignite the fluorescent lamp level and includes a pair of rectifying diodes D1 and D2, current limiting resistor R1, and storage capacitors C3 and C4. The anode of diode D1 is connected to one end of the high frequency blocking inductor L2 and to the cathode of diode D2. The cathode of diode D1 is connected to one end of resistor R1 and to the charging end of capacitor C3. The opposite end of the capacitor C3 is connected to the neutral rail 41B. The anode of diode D2 is connected to one end of storage capacitor C4, the opposite charging end of which is connected to the neutral rail 41B. The diodes D1 and D2 selectively allow the storage capacitors C3, C4 to charge during portions of each cycle of the 60 cycle sinusoidal input voltage. For example, diode D1 allows capacitor C3 to charge at the peak voltage of the positive half cycle of the input voltage, and diode D2 allows capacitor C4 to charge at the peak voltage of the negative half cycle. As described below, during this start-up phase, the sum of the voltage across C3 and C4 are supplied in a series circuit to the fluorescent lamps load. The voltage amplification performed by the illustrated amplification stage is 2:1 and is sufficient to start the fluorescent lamp.

In a specific embodiment, the components of the rectification and voltage amplification stage 48 have the following values: the rectifying diodes D1 and D2 are preferably UF4005 diodes, the current limiting resistor R1 is approximately 470 K$\Omega$ and is rated at ¼ watt, and storage capacitors C3 and C4 are approximately 15 $\mu$F.

The Active High Frequency Resonant Stage 52

Stage 52 comprises a diode D3, a pair of switching transistors Q1 and Q2, each having a collector emitter and base, free wheeling diodes D4 and D5, and a pair of reverse-breakdown voltage capacitors C5 and C6. Each of the free wheeling diodes D4 and D5, respectively, are connected between the collector and emitter of switching transistors Q1 and Q2, respectively. The resonant stage 52 further comprises transistor driving resistors R2 and R4, a primary inductor L3, which is associated with secondary inductors L4 and L5, a dc blocking capacitor C7, and a voltage feedback capacitor C9. The inductors L4 and L5 are advantageously provided by different windings on the core of primary inductor L3. Inductors L3, L4 and L are advantageously provided by an E core on which is wound the primary winding for L3 and the secondary windings for L4 and L5. Thus, inductor L3 is magnetically coupled to both inductors L4 and L5. The inductors L4 and L5 are oppositely poled and thus are driven out of phase relative to each other. More specifically, L4 generates the driving voltage for transistor Q1 during the positive half cycle of the input voltage, and inductor L5 generates the driving voltage for transistor Q2 during the negative half cycle. The freewheeling diodes D4, D5 provide a current path for the dissipation of magnetic energy stored in the coupled inducts L4 and L5 when transistors Q1 and Q2, respectively, are turned off. The resonant stage 52 is further connected electrically in series with the lamp load 60 that includes output connections 61A, 61B, 61C and 61D, and a lamp striking capacitor C8 which is also referred to as a "resonating storage capacitor". Preferably, a lamp filament element A s connected between connections 61A and 61B, and a lamp filament element B is connected between connections 61C and 61D.

The collector of transistor Q1 is electrically connected to a circuit junction 62, and the emitter is connected to circuit junction 64. The breakdown capacitor C5 is electrically connected between the base and emitter of transistor Q1. The driving resistor R2 is connected at one end to the inductor L4 and at another end to the base of transmitter Q1. The anode of diode D3 is connected to circuit junction 65, and the cathode is connected to circuit junction 64, and is electrically connected in series with the series combination of the inductor L3 and the dc blocking capacitor C7. One end of capacitor C7 is connected to the output connection 61A of the lamp load 60. The resonating storage capacitor C8 is electrically connected between the circuit connection 61B and 61D. The charging end of the feedback storage capacitor C9 is connected to the neutral rail 41B and the opposite end of the capacitor C9 is connected to the lamp connection 61C and to an input of the rectifier and voltage amplifier stage 48 via feedback path 55.

The collector of transistor Q2 is electrically connected to circuit junction 64 and the emitter is electrically connected to circuit junction 63. The breakdown capacitor C6 is connected between the base and emitter of transistor Q2. The base of transistor Q2 is electrically connected in series with driving resistor R4, the opposite end of which is connected to one end of inductor L5. The opposite end of the inductor L5 is connected to circuit junction 63.

In a specific embodiment, the components of the resonating stage 52 have the following values: the transistors Q1 and Q2 are BUL45 transistors, each having a collector, emitter and base, diode D3 is a UF4005 diode, the free wheeling diodes D4 and D5 are UF4005 diodes, the reverse-breakdown voltage capacitors C5 and C6 are approximately 0.1 $\mu$F, the transistor driving resistor R2 is approximately 66$\Omega$ and is rated at ½ watt, the transistor driving resistor R4 is approximately 56$\Omega$ is rated at ½ watt, the primary inductor L3 is a 4.0 mH inductor having 200 turns, which is associated with secondary inductors L4 having 3 turns and L5 having 3 turns, the dc blocking capacitor C7 is 0.15 $\mu$F, and the voltage feedback capacitor C9 is 0.0027 $\mu$F.

Starter Circuit and Start Mode of Operation

Capacitor C2, diac D6 and current limiting resistor R3 form a starter circuit that initially, at the application of power to the ballast circuit 40, actuates or turns ON the circuit transistor Q2 in the active resonant stage 52. The current limiting resistor R1 is further connected at one end to the storage capacitor C2, the diac D6 and an anode of a current blocking diode D3 at circuit junction 65. An opposite end of the storage capacitor C2 is connected to the anode of diode D2, the diac D6, and the current limiting resistor R3.

In a specific embodiment, the components of the starter circuit have the following values: the capacitor C2 is approximately 0.1 $\mu$F, diac D6 is an approximately 32 volt diac and current limiting resistor R3 is approximately 330Ω and is rated at ¼ watt.

During the start mode of the active resonant stage 52, the switching transistor Q2 is actuated by the starter circuit. Specifically, when capacitor C2 charges to a voltage greater than the reverse breakdown voltage of the diac D6, the diac D6 discharges through the current limiting resistor R3, turning ON transistor Q2. Once transistor Q2 is turned on, the switching transistors Q1 and Q2 alternately conduct during each half cycle of the input voltage and are driven during normal circuit operation by energy stored in the inductor L3 and transferred to the secondary windings of L4 and L5. Therefore, the starter circuit only operates during initial start mode and is not required during the normal operation of the resonant stage 52.

Resonant Mode of Operation

With further reference to FIG. 4, during normal or resonant operation, the ballast circuit 40 is energized by the application of the sinusoidal input voltage having a selected magnitude and frequency to the input power lines 41A and 41B. In the typical embodiment, the input power has a magnitude of 120 volts and a frequency of 60 hertz. The input voltage is filtered by the EMI filter stage 44, as described above, and produces an input current flow to the voltage and rectification circuit 48. During each positive half cycle, current flows through the series combination of diode D1, transistor Q1, inductor L3 and capacitors C7, C8 and C9. During each negative half cycle, current flows through diode D2, capacitor C2, transistor Q2 and capacitors C7, C8 and C9. During normal operation, capacitor C2 discharges through diode D3 after each negative cycle of the input voltage. Concomitantly, each storage capacitor C3 and C4 charges during the peak portion of each corresponding half cycle, and discharges during the other half cycle. For example, capacitor C3 charges during the positive half cycle of the input line voltage, and discharges through the neutral rail 41B during the negative half cycle, while capacitor C4 charges during the negative half cycle of the input line voltage, and discharges through the neutral rail 41B during the positive half cycle.

The inductor L3 stores energy along with the capacitors C7, C8 and C9, forming a series resonant circuit. These components produce a current having a selected elevated frequency, preferably greater than 20 Kilohertz, and most preferably around 40 Kilohertz, during normal operation of the ballast circuit. This high-frequency operation reduces hum and other electrical noises delivered to the lamp load. Additionally, high-frequency operation of the lamp load reduces the occurrence of annoying flickering of the lamp.

The resonating storage capacitor C8 stores a selected elevated voltage, preferably equal to or greater than 300 volts rms, which is required to start or ignite the fluorescent lamps mounted at the lamp connection 61A to 61D. Once the lamps are struck, the circuit operating voltage is reduced to a value slightly greater than the input voltage, preferably around 100 volts rms, which is maintained by the feedback capacitor C9, also referred to as the storage and feedback capacitor.

Improved Power Factor

A significant feature of this invention is that the power factor of the ballast is substantially improved over the prior art. Thus, a typical series resonant circuit provides for a poor power factor because the input appears very distorted and non-linear due to the effects of the storage capacitors and the rectification diodes. In a typical series resonant circuit, the rectification diodes are only turned ON during the periods of the peak voltages of the positive and negative cycles of the input ac voltage. Generally, the charging capacitor C3 charges up to its peak voltage during the positive input cycle and then dissipates during the negative input cycle causing the diode D1 to only turn ON during the peak dissipation period of the capacitor C3, i.e., the negative portion of the input cycle. Generally, the charging capacitor C4 charges up to its peak voltage during the negative input cycle and then dissipates during the positive input cycle causing the diode D2 to only turn ON during the peak dissipation period of the capacitor C4, i.e., the positive portion of the input cycle. This results in an input of varying current spikes at these peak periods which is not desired.

In the present invention, the feedback capacitor C9 feeds back a selected high frequency voltage level to the input of the voltage amplification stage 48. The capacitor C9 divides a high frequency feedback current from the lamp load between the neutral rail 41B and the input of the rectification circuit 48. In addition, C9 operates as a dc blocking capacitor for preventing the passage of unwanted dc voltage along the neutral rail 41B. This high frequency feedback current supplied by the feedback capacitor C9, when applied to the diodes D1, D2 at the input of the rectification circuit 48 expands the conduction angle of the diodes D1 and D2. The expansion of the conduction angle of the diodes D1 and D2 essentially forces the rectification diodes D1 and D2 to conduct during substantially the entire portion of their respective positive and negative half cycles. Therefore, the high frequency feedback current substantially eliminates the non-linear characteristic of the diodes, by causing them to conduct even during the low frequency current periods of each of the positive and negative half cycles. By eliminating the nonlinearities of the diodes, the ballast circuit appears as an almost linear load at the input voltage interface, i.e., a power factor of 95% or greater, thus achieving a very high level of power factor correction to the series resonant circuit.

The value of the feedback capacitor C9 determines the amount of the high frequency current that is fed back to the rectification circuit to achieve the desired power factor correction and the amount that is dissipated through the neutral rail. The larger the value of the capacitor C9 the lesser the amount of current that is fed back to the rectification circuit and visa versa. Therefore, in order to achieve the desired amount of power factor correction at the input of the rectification circuit, the feedback capacitor C9 has a value of between about 0.0047 $\mu$F and about 0.02 $\mu$F. In a specific circuit the feedback capacitor used is a polypropylene capacitor having a value of 0.01 $\mu$F with a tolerance of about +/−5%. With a voltage drop across the capacitor C9 preferably in the range of or greater than the input voltage, i.e., approximately 100 volts rms. Further, the capacitor preferably has a low power dissipation factor on the order of about 0.1%.

The ballast circuit 40 of the present invention achieves a power factor in the range of 0.95, by employing the feedback topology of the present invention which is a significant improvement over the power factor of 0.4 which was common in prior art ballast circuits. The feedback capacitor C9 also significantly reduces the total harmonic distortion of the lamp by dampening amplified higher order frequency harmonics present in the ballast circuit from the uncorrected input voltage.

Further Advantages of the Circuit of FIG. 4

Typically, series resonant circuits tend to amplify higher order harmonics, since the series resonant capacitor resonates with the inductance of the power line inductor creating a ringing affect that amplifies these higher order harmonics. The high frequency voltage, supplied by the feedback capacitor C9, modulates the amplitude of the low frequency input voltage and harmonizes the phases of the resonant circuit current and the input current. Further, the modulation of the amplitude of the low frequency input voltage functions as a carrier to transport the high frequency current over substantially the entire low frequency cycle, e.g., 60 hertz. Therefore, connecting the feedback capacitor C9 to the input of the voltage amplification stage 48 also significantly improves the total harmonic distortion. As is known, the feedback, or active power factor correction, capacitor C9 insures a relatively clean, e.g., correct sinusoidal input voltage waveform suitable for operating one or more fluorescent lamps. Correcting distortions of the input voltage waveform protects the lamp from damage by transient signal perturbations as well as control current distortions that arise from the non-corrected input voltage.

Another advantage of the resonant circuit 52 of the present invention is that it only requires a single linear inductor to control the switching of the resonant circuit and to limit the current that is applied to the lamp load. Resonant circuits of the prior art utilized either a combination of a saturation transformer to control the switching of the resonant circuit and a linear transformer to limit the current to the lamp load or two linear transformers one to control the switching of the resonant circuit and one to limit the current to the lamp load.

Compact Dimmable Fluorescent Lamp

Figure 5:
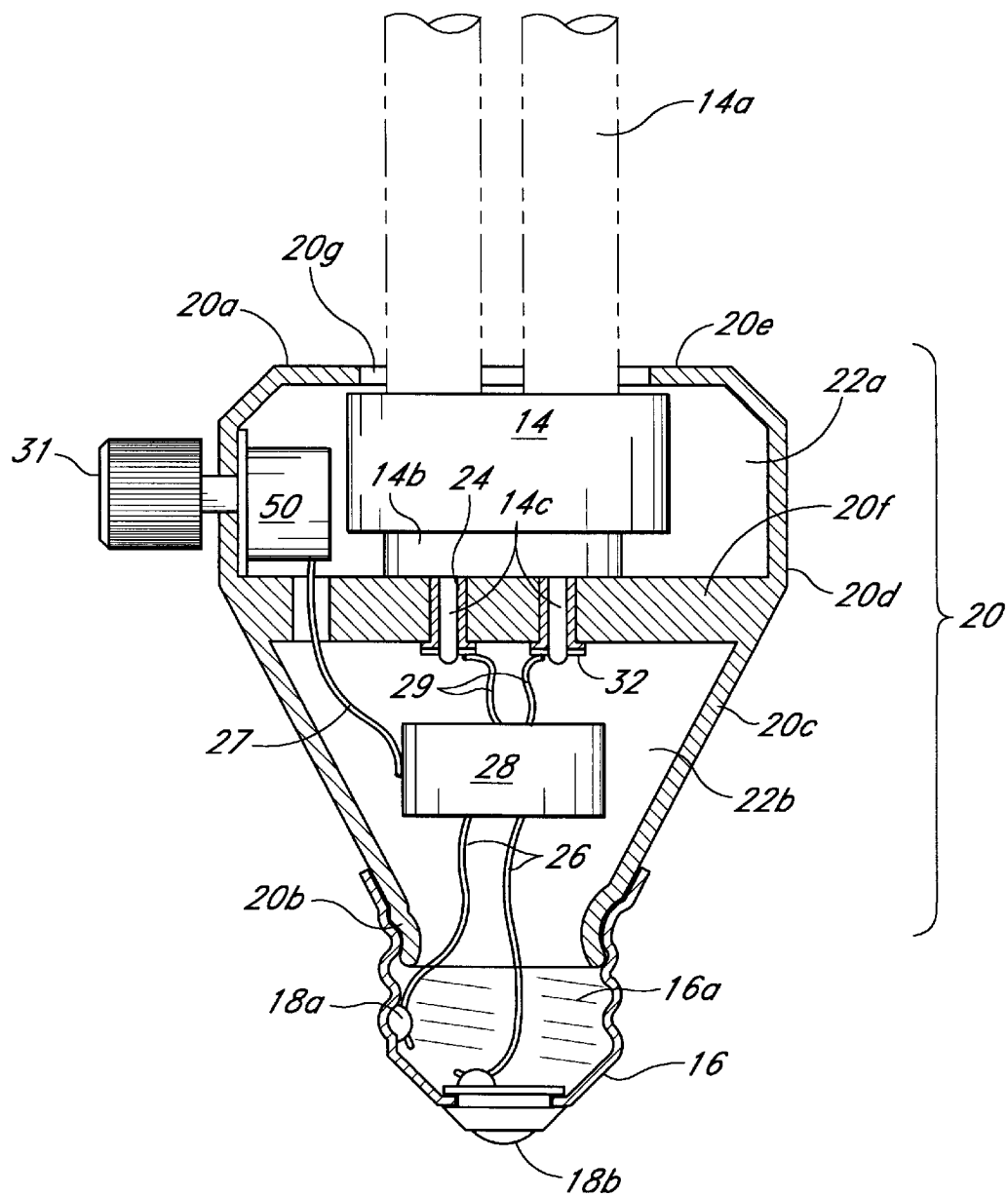
FIG. 5 is a side elevational view partly in section of a dimmable compact screw-in fluorescent lamp apparatus constructed in accordance with this invention.

FIG. 5 illustrates a compact dimmable fluorescent lamp 10 which is similar to the compact lamp illustrated in FIGS. 1 and 2 and includes a dimming capacity. The lamp 10 further comprises an electrical adjustment element 30, such as a variable resister, which has a manually adjustable knob 31. The adjustment element 30, which electrically connects with a dimmable ballast circuit 49 within the ballast circuit housing 28 via a conductor 27, produces a controllable electrical signal in response to adjustment of the position of adjustment element 30. The adjustable knob 31 is preferably manually accessible on the exterior of the tubular portion 20d of the housing 20.

The illustrated adjustable knob 31 is rotatable about an axis transverse to the longitudinal housing axis. A preferred electrical adjustment element 30 includes, for example, a plurality of gears within the housing 20 which engaged with a shaft of the electrical adjustment element 30 and with the shaft of a variable resistor.

Figure 6:
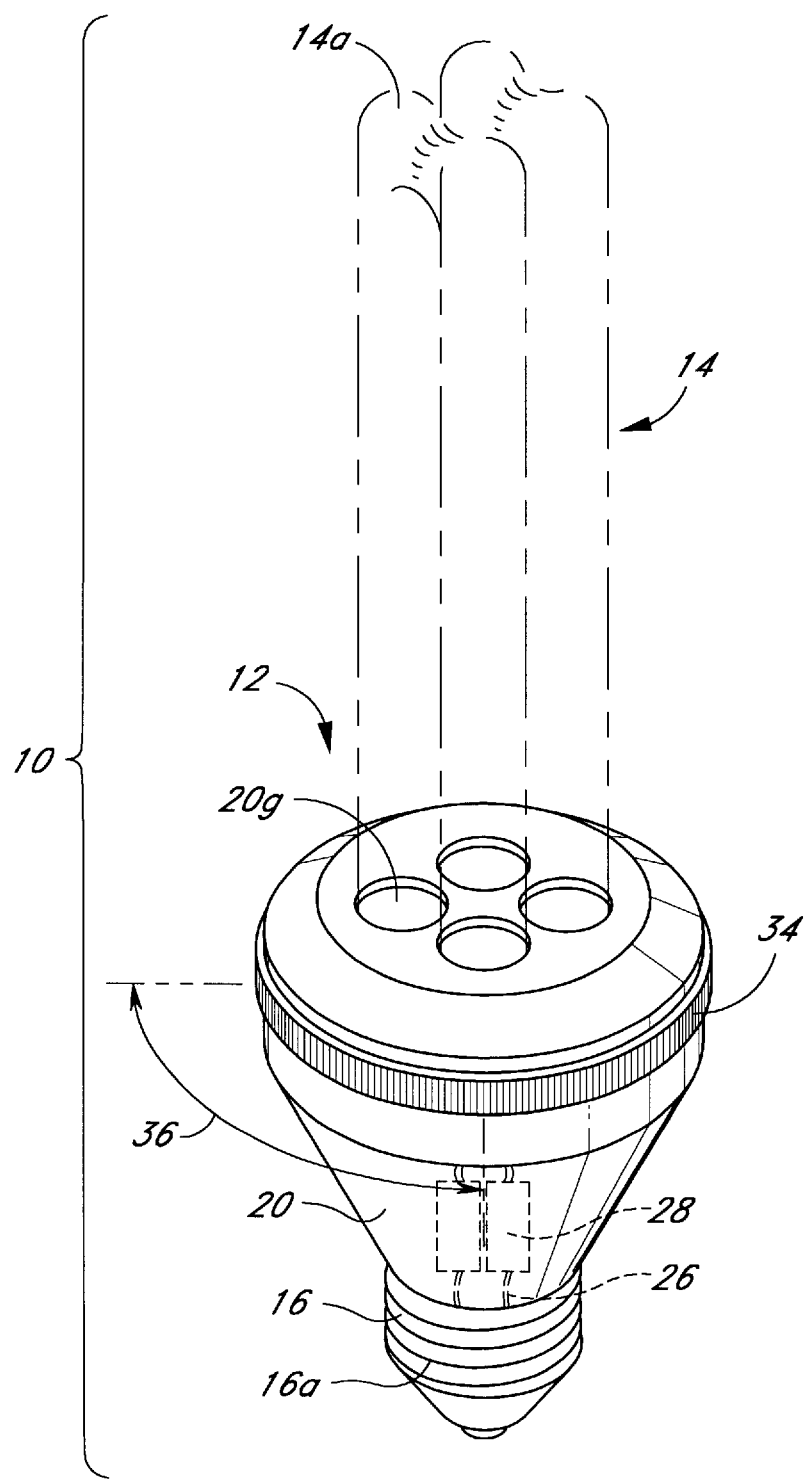
FIG. 6 is a perspective view of a dimmable compact screw-in fluorescent lamp apparatus according to an alternate embodiment of the invention.

In one alternate embodiment as illustrated in FIG. 6, the lamp apparatus is similar to the lamp apparatus of FIG. 5 except that the adjustable knob 31 on the adapter 12 is replaced with a dimmer control 34 that extends about at least a part of an outer circumference of the housing 20. The dimmer control 34 is rotatable moveable to the housing 20 about the housing's longitudinal axis, as indicated with an arrow 36 extending along the direction of the rotational movement round the circumference of the housing 20. The dimmer control 34 is mechanically linked to the adjustment element 30 within the housing 20 in a manner similar to that previously described in relation to knob 31. The illustrated dimmer control 34 encircles the housing tubular portion 20d to be accessible from any direction for manual adjustment. The dimmer control 34 electrically connects to the dimmable ballast circuit 49 within the ballast circuit housing 28, and manual circumferential movement of the dimmer control 34 varies the light output of the lamp to the desired brightness.

Figure 7:
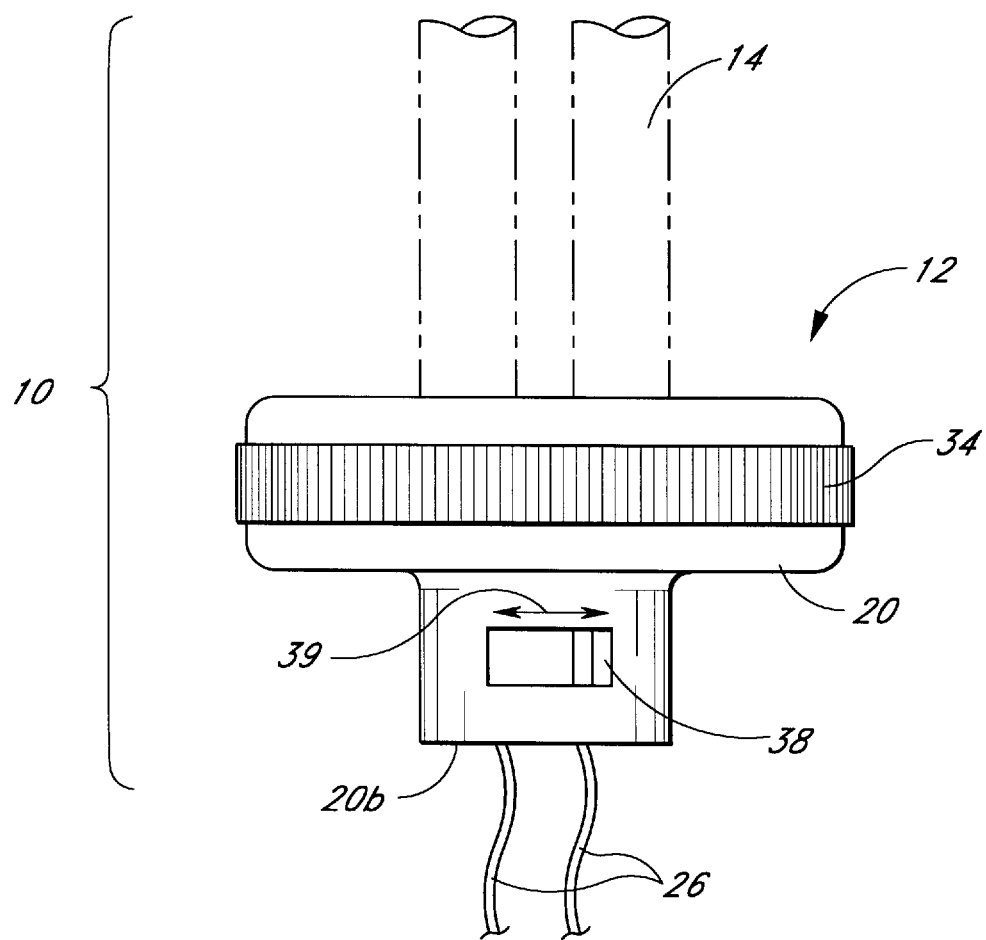
FIG. 7 is a perspective view of a dimmable compact fluorescent screw-in lamp apparatus according to another alternate embodiment of the invention.

In another alternate embodiment of the lamp apparatus as illustrated in FIG. 7, the lamp apparatus is similar to the lamp apparatus of FIG. 6 except that the adaptor 12 includes a switch 38 manually positionable and manually accessible external to the housing. The illustrated switch 38 is moveable between discreet positions relative to the housing 20, as indicated with an arrow 39. The switch 38 is connected to the dimmable ballast circuit 49 within the ballast circuit housing 28, FIG. 6, within the housing 20 and links with the input source of electrical power through electrical conductors 26, which can be directly wired to an electrical fixture for permanent installation of the lamp.

Placement of the switch 38 in one position enables current to flow from the electrical power source through the conductors 26 to the dimmable ballast circuit 49 within its housing 28, FIG. 6, thereby energizing the illumination element 14 and commencing operation of the lamp. Manual adjustment of the dimmer control 34 varies the light output as previously described. Placement of the switch 38 in another position terminates current flow to the control circuit, thereby ceasing lamp operation.

Figure 8:
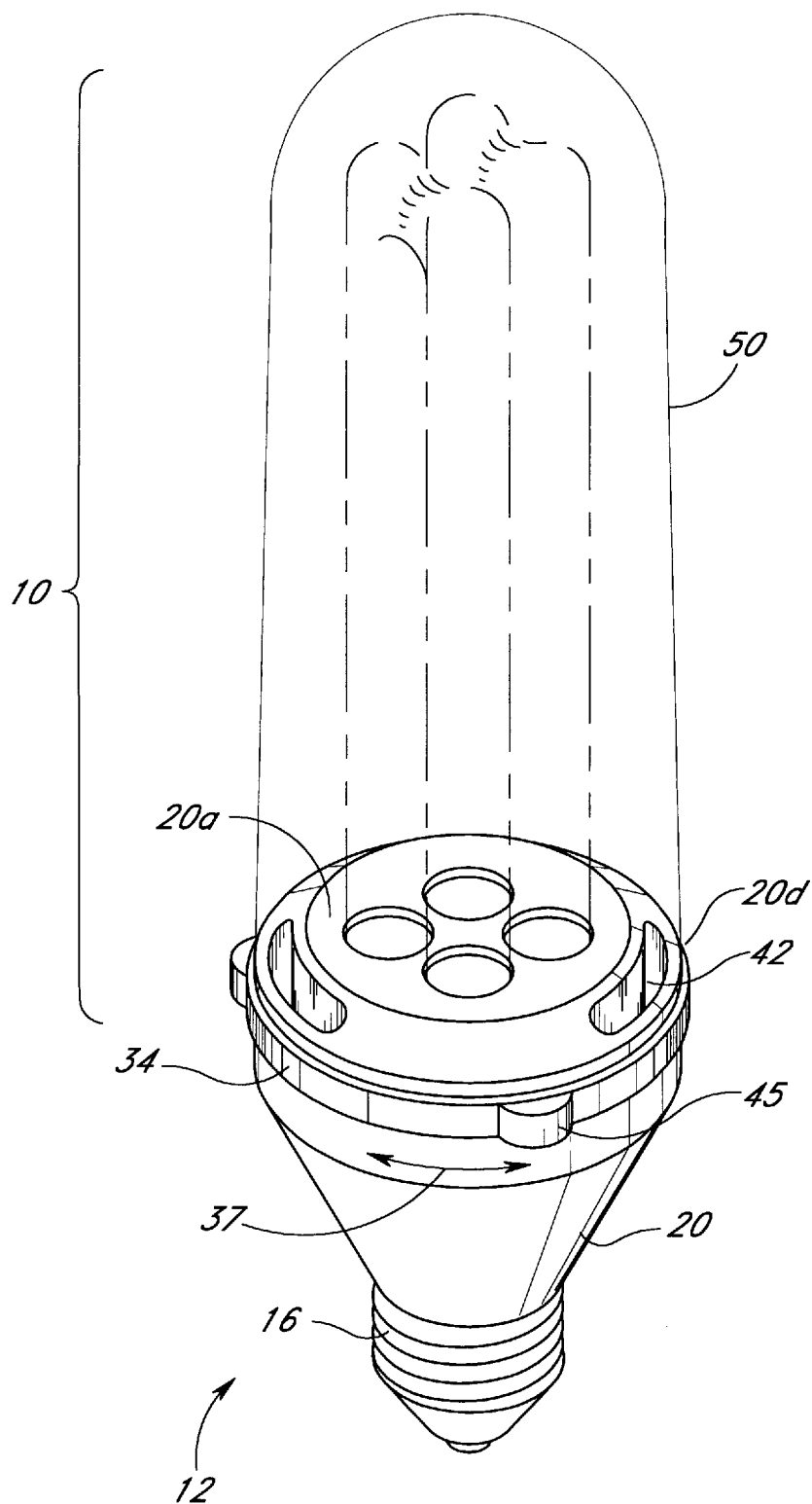
FIG. 8 is a perspective view of a dimmable compact fluorescent screw-in lamp apparatus according to a further alternate embodiment of the invention.
Figure 9:
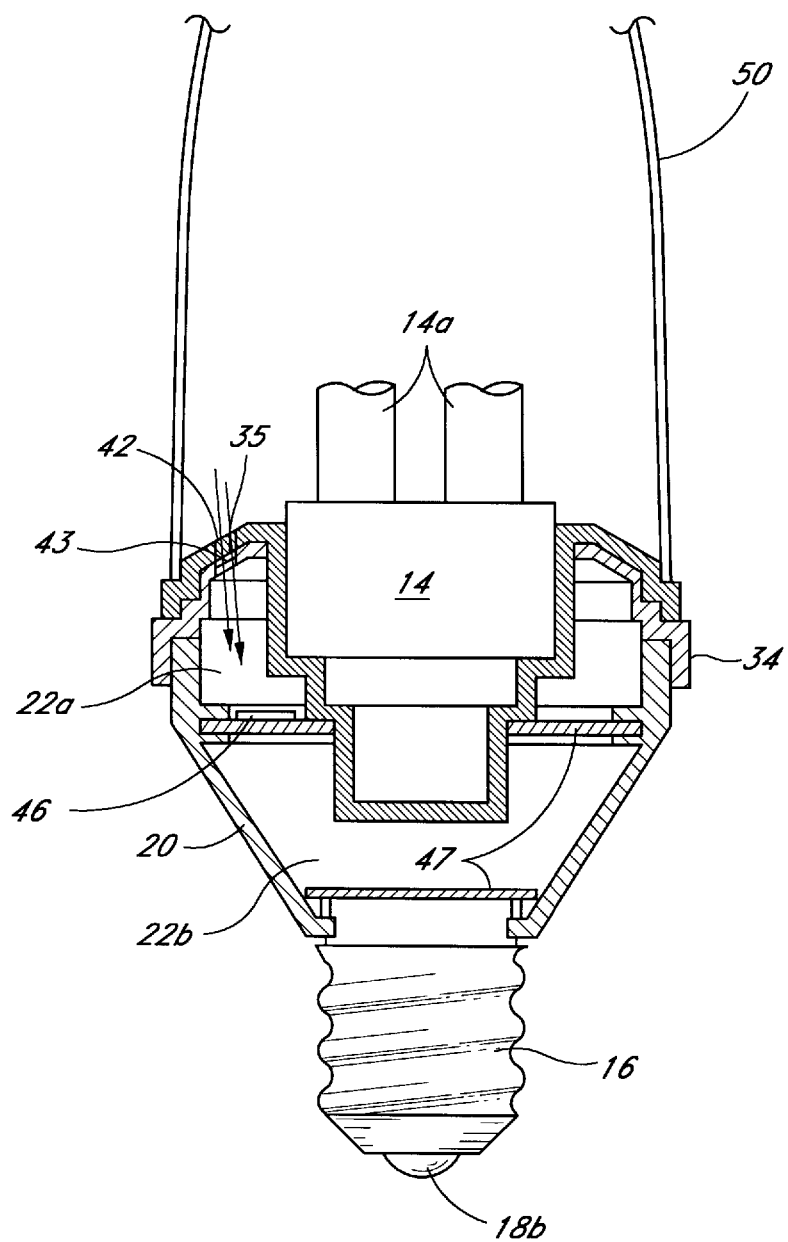
FIG. 9 is a partial sectional view of the embodiment of the dimmable compact fluorescent screw-in lamp apparatus illustrated in FIG. 8.

In another alternate embodiment of the lamp apparatus as illustrated in FIGS. 8 and 9, the lamp apparatus is substantially similar to the lamp apparatus of FIG. 6 except that the housing 20 includes one or more apertures 42. The apertures 42 permit entry of light from ambient surroundings, including other illumination sources and from the operation of the fluorescent illumination element 14, into the housing 20. The dimmable ballast circuit 49 within the housing 28, FIG. 6, of this embodiment preferably includes one or more light sensing elements 46 which can be mounted on a circuit board 47. The dimmable ballast circuit 49 within the circuit housing 28, FIG. 6, is preferably located in the lower space 22b of the housing 20 and can also be mounted on the circuit board 47.

The housing 20 preferably includes a plurality of apertures 42 which are preferably positioned at or near the top end 20a of the housing 20 and arranged around the periphery of the housing. The apertures 42 can also be located in the housing tubular portion 20d. The number and location of the light sensing elements 46 within the housing determines, at least in part, the number and placement of the apertures 42 in the housing 20.

The apertures 42 preferably have protective panes 43 which protect the components inside the housing 20 from the environment outside the lamp apparatus 10, such as moisture and dust. The protective panes 43 are preferably made of a thin, optically transparent or translucent material, such as glass or plastic, although other types of optical filters can be used. It may be desirable, for example, to use plastic film as the protective panes 43 to darken or otherwise filter the light sensed by the light sensing elements 46 in the adaptor 12. The protective pads 43 can be located adjacent to and above and/or below the apertures 42 and can be affixed to the housing 20 according to methods known to those of skill in the art.

The light sensing element 46 is preferably a photosensitive control element, such as, for example, a photocell or a phototransistor. Preferably, the number of light sensing elements 46 equals the number of apertures 42, and it is further preferred to arrange the light sensing elements 46 to be directly below the apertures 42 so that the light sensing elements 46 receive light entering the housing through the apertures 42. In a preferred embodiment, the lamp apparatus 10 includes a plurality of light sensing elements 46 placed around the periphery of the adapter 12 directly beneath the apertures 42.

The housing 20 further includes an optical adjustment element 34 which is manually accessible on the outside of the adaptor 12 and is movable relative to the housing about the longitudinal axis, as indicated with an arrow 37 extending along the direction of rotational movement. The optical adjustment element 34 is illustrated as a ring member with manually accessible knobs or protuberances 45. The optical block passage of light to the light sensing elements 46 within the housing 20. The aperture occluders 35 can be disposed within the housing 20, as shown in FIG. 7, or they can be located outside of the housing, or they can be located on the ring member itself. Preferably, the aperture occluders 35 are integrally formed with the ring member and extend axially from the ring member to shield the apertures from incoming light. The integrally formed aperture occluders preferably extend axially from the ring member below the aperture 42 and the light sensing element 46, as shown in FIG. 7. Movement of the optical adjustment element 34 around the periphery of the housing 20 causes movement of the aperture occluder 35 across the aperture 42, as shown in FIG. 6.

The lamp apparatus 10 shown in FIG. 6 can further includes an optically transparent or translucent dome 50 which fits snugly with the adaptor 12 and protects the fluorescent illumination elements 14 and the apertures 42 from dirt, moisture, shock and the like. The dome 50 can be made of, for example, glass or plastic. If the apertures 42 are located on the top end 20a of the housing, the dome 50 can be used to cover and protect the entire top portion of the housing 20, thereby possibly eliminating the need for separate protective panes 43 in the apertures 42. However, if the apertures 42 are located elsewhere on the housing, protective panes 43 are preferably used to isolate the components within the adapter housing 20 from the environment outside the adapter.

Operation of the lamp 10 is similar to the operation of the lamp 10 previously described. Manual positioning of the optical adjustment element 34 determines the position of the aperture occluders 35 with respect to the apertures 42. The dimmable ballast circuit 49 within the circuit housing 28 can be designed to turn the lamp on in response to either an absence of light or the presence of light at the light sensing elements 46. In one embodiment of the invention, when the aperture occluders 35 completely cover the apertures 42, no ambient light nor light from the fluorescent illumination element 14 can enter the housing and impinge on the light sensing element 46. Thus, there is no electrical signal generated by the light sensing element 46 to the dimmable ballast circuit 49 within the circuit housing 28, and the dimmable ballast circuit 49 within the circuit housing 28 turns the lamp on. When the aperture occluders 35 are adjusted to partially block the apertures 42, some ambient light and/or light from the fluorescent illumination element impinges on the light sensing element 46. A proportional electrical signal is thus generated by the light sensing element, thus driving the dimmable ballast circuit 49 within the circuit housing 28 to dim the lamp. When the aperture occluders are positioned so as not to block any portion of the apertures 42, any ambient light and/or light from the fluorescent illumination element can enter the aperture and impinge on the light sensing element 46 within the adapter. A maximum electrical signal is generated by the light sensing element 46, thus causing the dimmable ballast circuit 49 within the circuit housing 28 to turn the lamp off.

In an alternative embodiment, complete blockage of the apertures 42 by the aperture occluders 35 can cause the dimmable ballast circuit 49 within the circuit housing 28 to turn the lamp off. Conversely, positioning the aperture occluders 35 so that they do not block the apertures can cause the dimmable ballast circuit 49 within the circuit housing 28 to turn the lamp on.

Dimming and brightening of the lamp are thus easily and conveniently achieved by manual positioning of the optical adjustment element 34 on the outside of the lamp.

The lamps thus described in association with FIGS. 5-9 provide dimmable and brightenable fluorescent light with manual adjustment of the knob 31 or the dimmer control 34 on the housing of the lamp. With the electrical connection of the lamp 10 to an electrical power source, the illumination element 14 provides variable fluorescent light output according to the position of the adjustable knob element 30, or dimmer control 34, either of which is electrically connected to the dimmable ballast circuit 49 within the circuit housing 28.

Block Diagram of the Preferred Embodiment of the Improved Ballast

Figure 10:
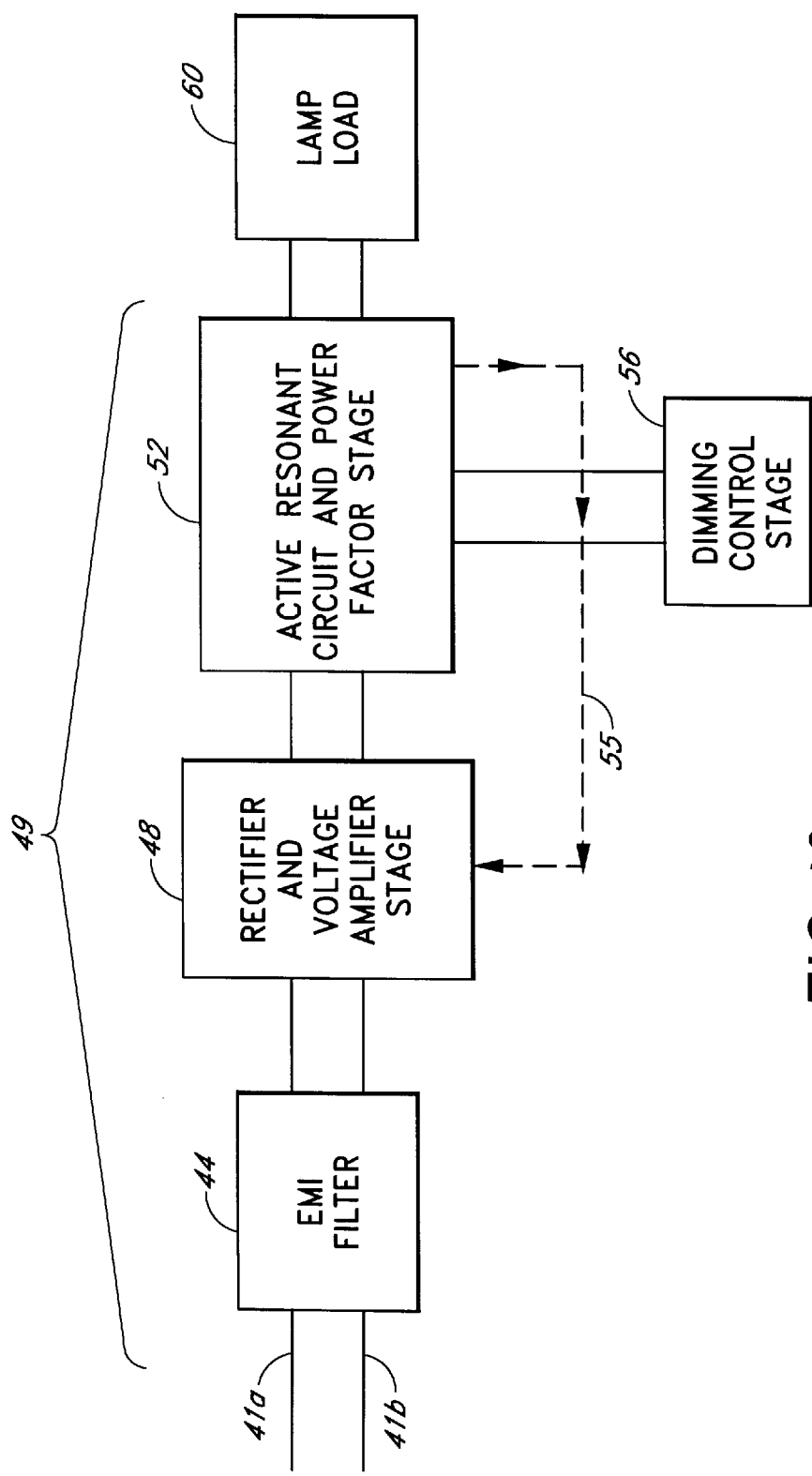
FIG. 10 is a block diagram of a dimmable ballast circuit constructed in accordance with this invention for use with the compact lamp apparatus of FIGS. 5, 6, 7, 8 and 9.

FIG. 10 is a block diagram of a fluorescent lamp and dimmable ballast circuit 49 in accordance with one aspect of the present invention. The illustrated dimmable ballast circuit 49 comprises similar elements to the ballast circuit 40 illustrated in FIG. 3, such as an EMI filter stage 44, a rectification and voltage amplification stage 48, an active resonant circuit and power factor correction stage 52 and a lamp load 60, connected as shown. The dimmable ballast circuit 49 also includes a dimmable control stage 56 which is connected in parallel to the active resonant circuit and power factor stage 52. The dimming stage 56 is electrically connected to the resonant circuit and power factor stage 52 and produces an output dimming signal for varying the current supplied to the lamp load 60 by the resonant circuit 52 as described in greater detail below.

Circuit Schematic of One Embodiment of the Ballast

Figure 11:
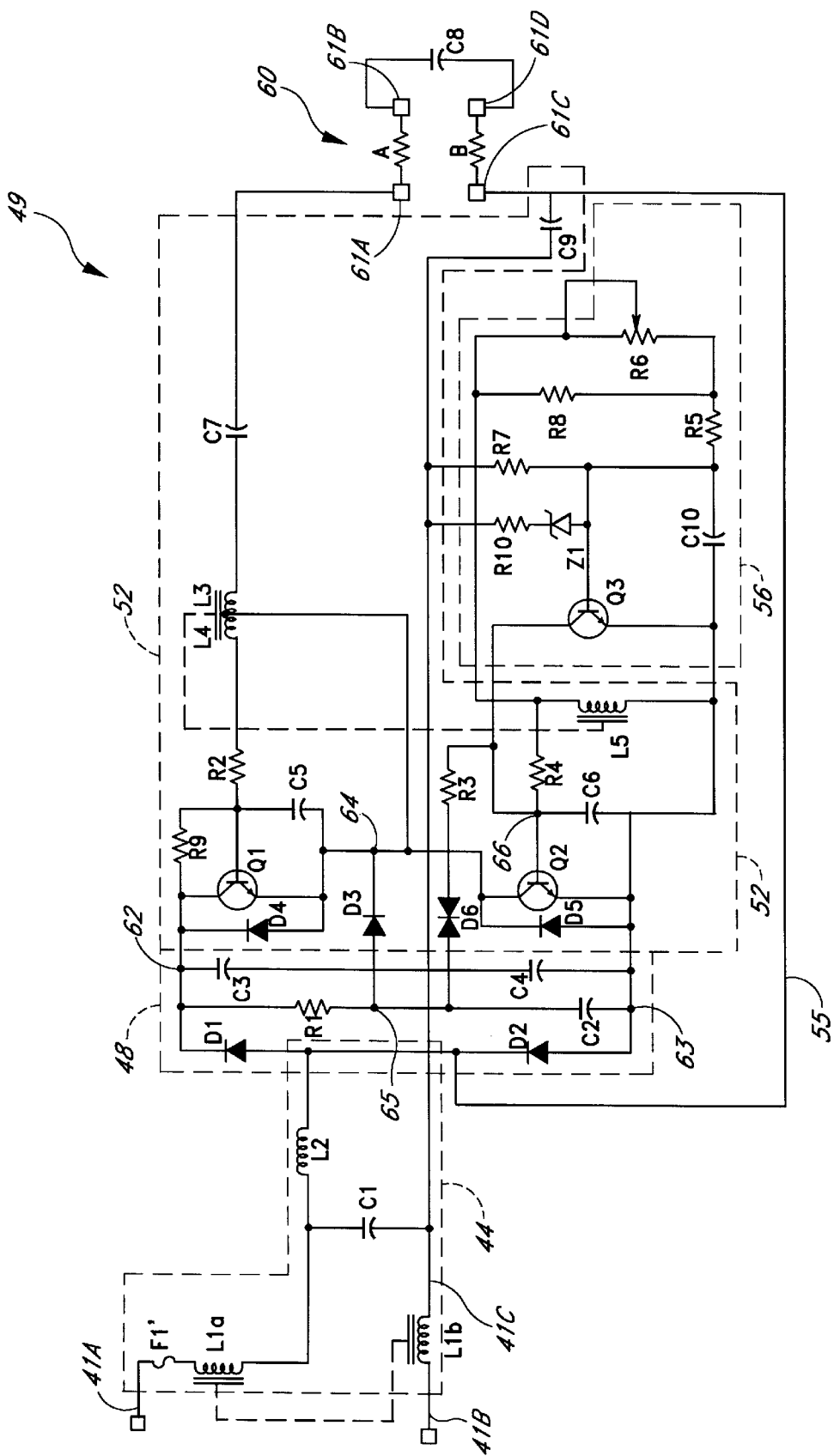
FIG. 11 is a schematic circuit diagram of the dimmable ballast circuit of FIG. 10.

FIG. 11 illustrates a dimmable ballast circuit in accordance with one aspect of the present invention. The dimmable ballast circuit 49 operates in a similar manner as the ballast circuit 40 described in association with FIGS. 3 and 4. EMI filter stage 44 relocates the fuse F1' in series with the high voltage input line 41A and inductor L1a. In the specific circuit, fuse F1' is advantageously formed as a fusible link on the printed circuit. Inductor L1 includes L1a and L1b, respectively, connected to both sides of the line voltage so as to buffer both lines for protecting the line against EMI. Advantageously, both L1a and L1b are magnetically coupled and are provided by two windings on a single core. Thus, the addition of the inductor L1b provides for a buffered neutral rail referred to as 41C. Also, in the specific embodiment, a resistor R9 of 1 meg ohm is connected between the collector and base of transistor Q1.

The dimming feature is provided by the addition of the dimming stage 56. The dimming stage 56 includes a transistor Q3, storage capacitor C10, resistor R5, variable resistor R6, and a delay circuit comprising resistors R7, R10 and zener diode Z1. Although shown as part of a resonant circuit 52, those of ordinary skill in the art will recognize that the transistor driving resistor R4 and the inductor L5 can be included in the dimming stage 56. A collector of transistor Q3 is electrically connected to circuit junction 66. An emitter of transistor Q3 is electrically connected to one end of inductor L5, one end of capacitor C6, and one end of capacitor C10. The opposite end of capacitor C10 is connected to the base of transistor Q3 and one end of resistor R5. The opposite end of resistor R5 is connected to one end of the variable resistor R6. The opposite end of the variable resistor R6 is connected to one end of resistor R4. A resistor R8 is connected in parallel with variable resistor R6. The delay circuit is connected between the buffered neutral rail 41C and the base of the transistor Q3. More specifically, a resistor R7 is connected at one end to the buffered neutral rail 41C and at the other end to the base of the transistor Q3. Also, one end of a resistor R10 is connected to the buffered neutral rail 41C and the opposite end of the resistor R10 is connected to the cathode of the zener diode Z1 and the anode of the zener diode Z1 is connected to the base of transistor Q3. The operation of the delay circuit will be described in more detail below. The capacitor C10 and the resistor R5 form an RC circuit that preferably has a time constant between about 1 microsecond and about 6 microseconds.

In a specific embodiment, the components of the dimming stage 56 have the following values: the transistor Q3 is a 2N3904 transistor, the storage capacitor C10 is approximately 0.01 $\mu$F, the resistor R5 is approximately 1 K$\Omega$ and is rated at ¼ watt, the variable resistor R6 is approximately 2 K$\Omega$ and is rated at ¼ watt, the resistor R8 is approximately 10 K$\Omega$, the resistor R8 is approximately 10 K$\Omega$ and zener diode Z1 is an IN5281 zener diode.

The illustrated dimming stage 56 adjusts the level of lamp illumination by turning OFF transistor Q2 for selected portions of the voltage half cycle in which the transistor Q2 would normally be turned ON, i.e., conducting. In a preferred embodiment, the conduction state of transistor Q3 controls the conduction state of transistor Q2. Specifically, when transistor Q3 conducts, transistor Q2 turns OFF and, conversely, when transistor Q3 is turned OFF, transistor Q2 conducts.

The variable resistor R6 controls the conduction state of transistor Q3 by varying the voltage drop across capacitor C10. According to one embodiment, when the dimming stage total dimming resistance, defined as the cumulative resistance of resistor R5 and variable resistor R6, is relatively high, referred to as a minimum dimming condition, the voltage drop across capacitor C10 is insufficient to turn ON transistor Q3. During these conditions, transistor Q2 continues to conduct uninterruptedly during its normal conduction portion of the resonant circuit, and maximum current is supplied to the lamp load 60 to produce maximum lamp illumination. When the total dimming resistance is relatively low, the voltage drop across capacitor C10 increases and turns ON transistor Q3, which then prematurely turns OFF transistor Q2 during some selected portion of the resonant circuit cycle. When Q2 turns off, the resonant circuit automatically switches to the Q1 conduction portion of the resonant circuit. The total dimming resistance can be varied by manually adjusting the variable resistor R6 to define a lower or higher resistance for minimum dimming or maximum dimming, respectively. Specifically, the total dimming resistance as defined by the variable resistor R6 and resistor R5 determines the specific portion of the resonant circuit cycle in which transistor Q2 conducts. This, in turn, determines the amount of the lamp driving current that is applied to the load, and thus determines the lamp illumination level.

Current Waveforms

Figure 12:
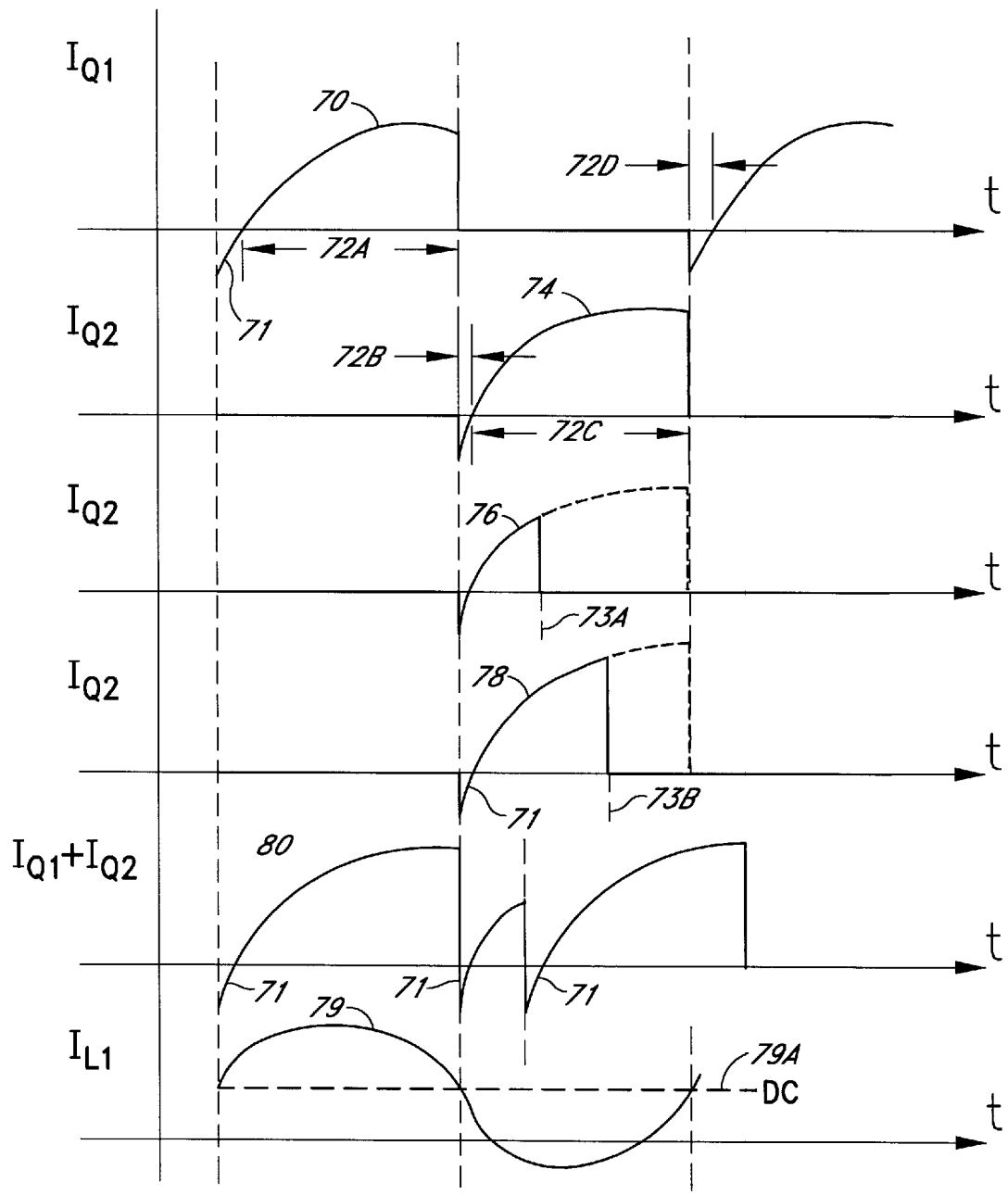
FIG. 12 graphically illustrates selected current waveforms of FIG. 11.

FIG. 12 illustrates the theoretical current waveform at the collectors of transistors Q1 and Q2 during operation of the dimming circuit 56. The dashed lines represent each half cycle of the input circuit ac current and are provided to illustrate the operation of the transistors during the resonant circuit cycle. Waveform 70 shows the theoretical collector current of transistor Q1 during normal operation of the ballast circuit 49. The transistor collector current is substantially identical during both dimming and non-dimming conditions since the conduction of transistor Q1 is substantially unchanged during its normal conduction interval. Likewise, waveform 74 shows the theoretical current through the collector of transistor Q2. As shown, transistors Q1 and Q2 conduct during opposite half cycle portions of the sinusoidal circuit current. The negative current values shown as triangular downward spikes, denote the period when both transistors Q1 and Q2 are turned off. However, each freewheeling diode D4 and D5 conducts current when its respective transistor is turned off, thus maintaining a circuit pathway for the flow of the coupled inductive current during this time period. As shown in the illustrated waveform 70 and 74, the sequence of current flow through the transistors Q1 and Q2 and the free-flowing diodes D4 and D5 is as follows: Current flows from the emitter of transistor Q1 for a selected period 72A; current flows through the freewheeling diode D4 for a selected period 72B with transistor Q1 turned off; current flows from the emitter of transistor Q2 for a selected period 72C; and finally current flows through the free-wheeling diode D5 for a selected period 72D with transistor Q2 turned off.

Waveforms 76 and 78 show that conduction of transistor Q3 prematurely turns OFF transistor Q2 for selected portions of its normal conduction interval. Waveform 76 shows the current waveform of transistor Q2 with its conduction interval interrupted at a first selected location 73A. Similarly, waveform 78 shows the current waveform of transistor Q2 with its normal conduction interval interrupted at a second selection location 73B.

A representative combined circuit waveform 80 of transistors Q1 and Q2 with a normal conduction interval of transistor Q2 prematurely terminated illustrates that the duty cycle of the sinusoidal circuit is adjusted variably by the variable resistor R6. When the Q2 transistor is forced OFF, the Q1 transistor turns ON and begins its portion of the resonant cycle. After the Q1 transistor completes its portion of the cycle, the Q2 transistor will turn ON for its suppressed portion of the cycle and then will switch back to the Q1 portion of the cycle. The compression of the resonant cycle by the suppression of the Q2 transistor therefore increases the frequency of the resonant cycle by causing the operation of the Q1 and Q2 transistors to switch back and forth more frequently. The shifted current waveform produces an additional dc current component in the ballast circuit during operation. For example, the current waveform 79 of inductor L1 shows the alternating current passing through the inductors during dimming. The compressed conduction cycle of the transistors Q1 and Q2 produces a vertical shift in the current waveform which corresponds to an additional dc current component 79A. This dc current component 79A is filtered from the resonant circuit by the dc blocking capacitor C7. The excess charge that develops across capacitor C7 reduces overall operating voltage of the ballast circuit and thus reduces the level of current supplied to the lamp. Consequently, the resistor R6 controls the relative level of lamp brightness.

Avoidance of Striation and Flickering Problems

The dimmable ballast circuits of the prior art suffered from striation problems and flickering problems, because the dimmable ballast circuits were not capable of properly driving the lamp load during certain dimming conditions, i.e, insufficient power was being supplied to the filaments. The dimmable ballast circuit 49 of the present invention dims the lamp by reducing the current delivered to the lamps, however at the same time the voltage delivered to the lamps by the resonating storage capacitor C8 is increased, therefore the power to the filaments is maintained at a proper driving level. During full power, the filament voltage is approximately 2.2 volts. During a 20% dimming condition, the filament voltage increases to approximately 4.5 volts.

Referring also to FIG. 11, there are two features of the lamp circuit which enable the increased voltage buildup at the resonating storage capacitor C8. As described above, the first reason for the increased voltage at the filaments is that the overall dc voltage of the resonating circuit increases and therefore the voltage applied to the filaments is increased. The second reason is that the shrinking conduction time of the Q2 transistor during dimming conditions increases the frequency of the resonating circuit. The increased frequency of the resonating circuit causes the capacitor C8 to have a lower impedance. The lower impedance of the capacitor C8 enables an increase in the current through the capacitor which increases the overall power applied to the filament.

Further, by maintaining the power delivered to the filament at a preferred driving power range, the dimmable ballast circuit 49 of the present invention is capable of properly driving the lamp filament over a wider dimming range without having the flickering and striation problems associated with prior art dimmable fluorescent lamps.

Delay Circuit

As described above, a delay circuit is connected to the base of transistor Q3. This delay circuit comprises a zener diode Z1 in series with a resistor R10, and this series circuit in parallel with a much higher resistor R7. The zener diode Z1 ensures proper start-up operation of the fluorescent lamp by forcing the ballast circuit 49 to initially operate in maximum dimming conditions, e.g., minimum total dimming resistance. This condition exposes the fluorescent lamp filaments to an appropriately high voltage level. During start-up operations, the voltage amplification forces the zener diode Z1 to operate in its reverse breakdown region, thus temporarily bypassing the resistor R7 and maintaining a voltage drop across capacitor C10 sufficient to cause Q3 to remain on and Q2 to remain off. Consequently, the dimming circuit 56 operates during start-up for maximum dimming, regardless of the position of the variable resistor R6. This topology allows the ballast circuit to accumulate high voltage levels across the lamp filaments and at the resonating storage capacitor C8, for subsequent striking of the lamp. Once the lamp is struck and the ballast circuit operates at the substantially reduced circuit running voltage, the zener diode Z1 stops conducting, and the high resistor R7 is again electrically associated with the dimming circuit.

Prevention of Catastrophic Breakdown of the Compact Fluorescent Lamp

Currently available compact fluorescent lamps are subject to catastrophic breakdown. Thus, as the lamp breaks down over its useful life, the impedance in the filaments increases. As the impedance in the lamp increases a few noticeable problems occur which include flickering of the lamp. In addition, if the current applied to the lamp remains the same over time while the lamp impedance increases, the voltage in the lamp increases proportionally to the increase in the lamp impedance. As the increase in lamp voltage occurs, the lamp filaments operate as capacitors and store the increased dc voltage. As the stored dc voltage in the lamp increases, the voltage across the feedback capacitor C9 increases as well. Eventually, the voltage in the filaments will increase to a level which, in an extreme case, can cause the filaments to explode. Explosion of the filament can, in turn, cause the external glass surrounding the filament to shatter and spread shards of glass for several feet. In addition, the voltage in the filaments may increase to a level which is too high for the feedback capacitor C9 and/or the transistors Q1, Q2 and Q3 to handle and these components will be ruined, destroying the ballast circuit 49.

A significant feature of the ballast circuit 49 of FIG. 11 is that it operates to avoid such destructive breakdown. Thus, when the voltage in the filaments rises to reach a predetermined threshold level, a voltage responsive device connected to the compact fluorescent lamp and to the active high frequency resonant circuit causes the active circuit to automatically reduce the flow of current to the compact fluorescent lamp to below the level which may result in destructive breakdown of said compact fluorescent lamp. In a preferred embodiment, the voltage responsive device is a zener diode Z1 which will break down when the voltage in the filaments reach a predetermined threshold level. When the zener diode Z1 breaks down, it automatically triggers the operation of the dimming circuit 56 at the maximum dimming condition. The break down of the zener diode Z1 causes the current to temporarily bypass the resistor R7 and maintain a voltage drop across capacitor C10 sufficient to cause Q3 to remain mostly on and Q2 to remain mostly off. As described above, the operation of the dimming transistor Q3 alters the duty cycle of the power transistors Q1 and Q2. The change in the duty cycle of the power Q2 and Q3 transistors thus automatically limits the power applied to the filaments.

By forcing the dimming circuit into the maximum dimming condition, the dimming of a compact dimmable fluorescent lamp can no longer be varied. Advantageously, the lack of control over the dimming of the lamp results in a warning to the user that the useful lifetime of the lamp(s) is coming to an end and the lamp(s) need to be replaced. Thus, in some embodiments the user can replace the fluorescent lamp tube(s) that are connected to the ballast circuit. Once the old fluorescent lamps are replaced with new lamp(s), the compact fluorescent lamp apparatus will return to its normal operating conditions and the dimming feature will be restored.

Preferably, the zener diode Z1 is selected to break down at a level which will keep the power applied to the filaments well below the manufacture's specified power level limits which may result in a destructive breakdown of the filament of the fluorescent lamps. In a specific embodiment, the manufacturer's power level limit is 10 watts/filament. With a power level limit of 10 watts/filament, the ballast circuit of the invention is set to keep the power to the filaments below approximately 4 watts/filament to ensure proper performance of the lamp without flickering problems or an explosion occurring at the end of the lamps life. In this specific embodiment, the zener diode Z1 in FIG. 11 is selected to have a breakdown threshold of approximately 200 volts. Therefore, the improved ballast circuit of this invention results in a more consistent performance of the lamp and prevents a catastrophic failure at the end of the useful life of the compact lamp.

Advantages of the Ballast Circuit of FIG. 11

The ballast circuits of the prior art, both dimmable and non-dimmable, required a larger number of components than the dimmable ballast circuit of the present invention. The large number of components in the prior art ballast circuits resulted in a low power efficiency of the circuit. Further, the additional components lowered the overall reliability of the circuit. Finally, the larger number of components caused difficulties in the manufacturing of the circuit.

A significant feature of the ballast circuit of the present invention is that it requires only one single active stage to perform all the necessary functions of a ballast circuit, including lamp start-up, lamp driving operations, and local dimming of the lamp. The streamlined circuit design of FIG. 11 also provides for high electrical efficiency of the operating circuit because of the lack of additional parasitic active stages. In addition, as discussed above, the illustrated resonant circuit provides for low total harmonic distortion and for high power factor correction, for example, achieving a power factor of 0.95 or greater.

By only requiring one active stage, the ballast circuit of the present invention emits less electromagnetic interference (EMI) and radio-frequency interference (RFI) than prior art fluorescent lamp ballast circuits. The prior art ballast circuits has at least two actives stages which operated at different frequencies. The noise caused by the independent active stages operating at different frequencies combines to form a large level of noise which has several different components which are hard to separate and filter out. The ballast circuit of the present invention has only one active stage and therefore produces noise at only one frequency and at a significantly lower level than the multiple active stage ballast circuits of the prior art. By only having a ballast circuit with only one active stage, the EMI filter stage 44 is able to filter the electromagnetic interference (EMI) to an acceptable level. Further, by having only one frequency of noise produced by the single active stage of the ballast circuit, the radio-frequency interference (RFI) can be kept at an lower more acceptable level.

The lower component count of the compact ballast circuit of the present invention reduces the reliability and manufacturing problems common in prior art dimmable ballast circuits. In addition, by lowering the active component count, the power dissipation across the dimmable ballast circuit of the present invention is significantly lower than in ballast circuits of the prior art. The lowered powered dissipation of the dimmable ballast circuit causes a lower ambient temperature in the ballast circuit housing 28. The lower ambient temperature reduces the long term stress on the components of the ballast circuit and increases the overall reliability of the circuit.

Many prior art ballast dimmer circuits can suffer catastrophic failure if power is applied without a fluorescent lamp in its socket. This adverse phenomena cannot occur with the invention since with the lamp removed, the circuits of both FIG. 4 and FIG. 11 are open circuit and the active resonant stage cannot initiate resonant high-frequency operation.

Further, many prior art lamps can suffer from a destructive breakdown or explosion at the end of their useful lives due to a voltage buildup in the filaments. This voltage buildup causes the filaments to explode within their glass housing and results in shards of glass being strewn for several feet. This adverse phenomena does not occur with the addition of an explosion prevention circuit in accordance with one aspect of the present invention. The improved ballast circuit of this invention limits the voltage buildup in the lamp filaments which prevents the filaments from exploding at the end of their lifetime. In addition, this circuit results in a more consistent performance of the lamp.

The illustrated dimmable circuit at FIG. 11 can further be modified for use with a non-dimmable fluorescent lamp by replacing the variable resistor R6 with a fixed resistor (not shown). The value of the fixed resistor preferably continually biases this transistor Q3 off, allowing the application of maximum power to the fluorescent lamp. Alternatively, the entire dimming stage 56 can be removed from the circuit as discussed in association with FIG. 4, to reduce the overall cost of manufacturing the ballast circuit.

Remote Dimmer Control

Although the specific embodiments described above have been described with reference to the dimmable control ballast being located as an integral unit with the fluorescent lamp, the present invention can also be advantageously used as a remote dimmer control, e.g., used in a wall-mounted control unit. A particular advantage of the circuit of FIGS. 10 and 11 is that as shown, only two wires are needed to connect the remotely mounted ballast stage 40 and the fluorescent lamp 60.

Additional Embodiments of Dimmer Control

Figure 13:
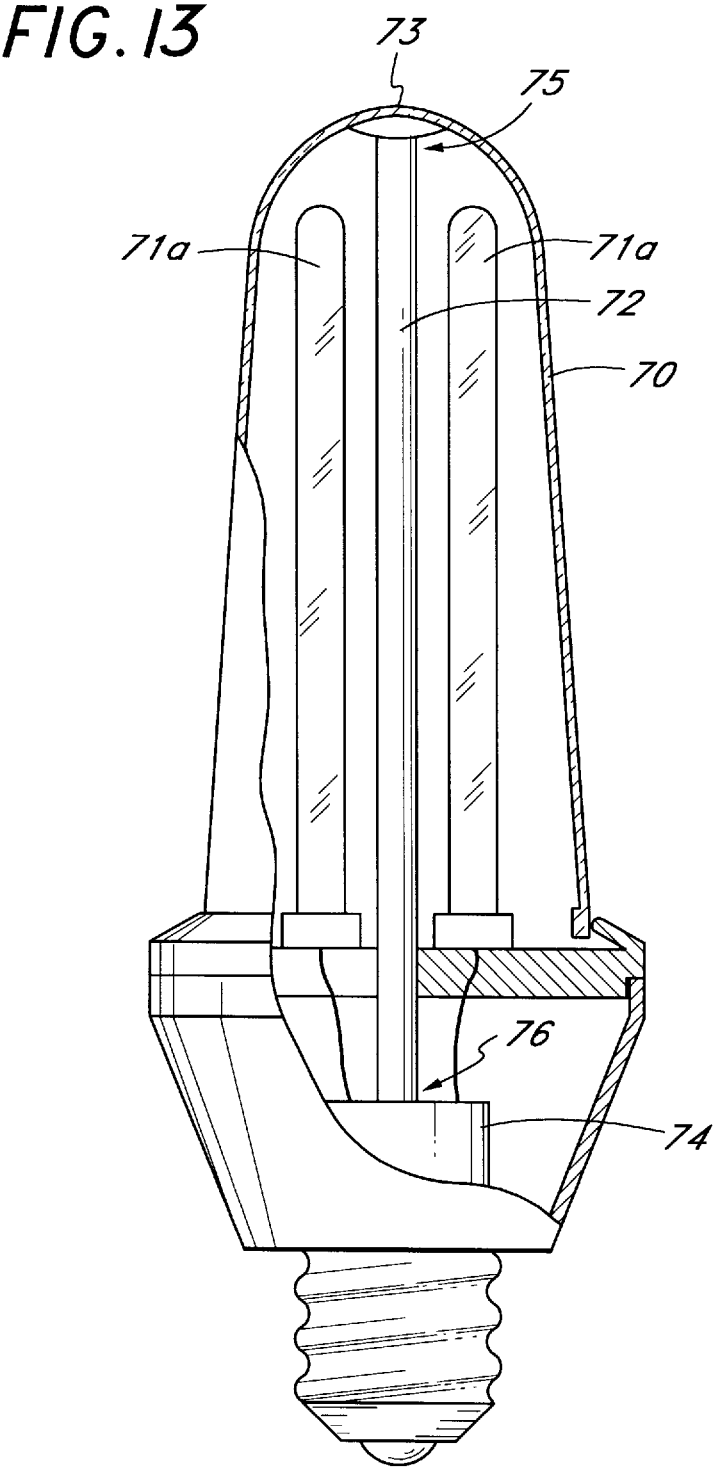
FIG. 13 is a partial sectional view of another embodiment of a dimmable compact screw-in fluorescent lamp apparatus.
Figure 14:
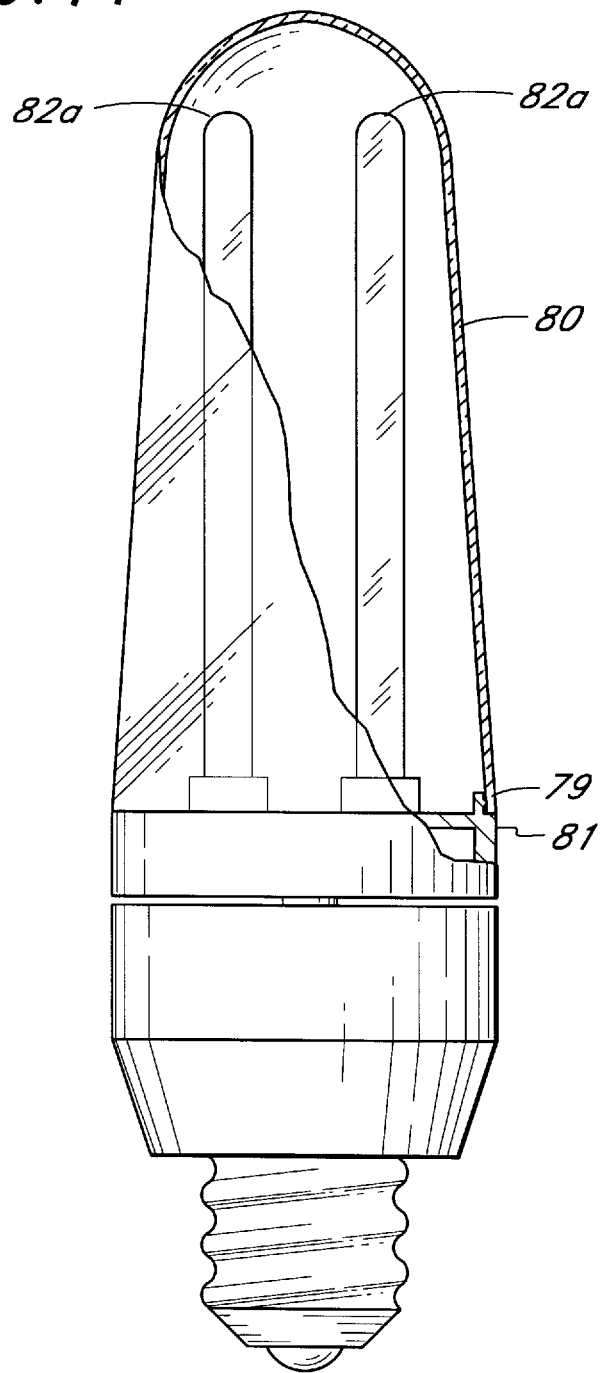
FIG. 14 is a partial sectional view of still another embodiment of a dimmable compact screw-in fluorescent lamp apparatus.

FIGS. 13 and 14 show two additional embodiments in which an external translucent globe 82 covers the fluorescent lamp tubes 84a. In both of these embodiments, rotation of the globe causes the fluorescent lamp to dim in one direction of rotation and becomes brighter in the opposite direction of rotation.

Referring to FIG. 13, the top end 94 of rod 86 is affixed to the inner apex 88 of the globe 82. The opposite bottom end of the rod extends to the ballast housing 90. In this embodiment, the housing exposes the control of variable resistor R6 of FIG. 11 and the bottom end of the rod 92 is attached to this control so that as the rod is rotated by rotating the globe 82 about the axis of the rod 86, the fluorescent tubes 84a are dimmed by rotation in one direction and became brighter by rotation in the opposite direction.

The lamp shown in FIG. 14 generally operates in the same manner as FIG. 13 but is structurally somewhat different. In this embodiment, the bottom end 96 of the translucent globe 98 engages by a friction clamp or otherwise an annular ring 100. This ring 100 in turn is connected to the variable resistor R6 of FIG. 11 so that when the globe 96 is rotated in one direction the fluorescent tubes 102a are dimmed and when the globe 96 is rotated in the opposite direction, the tubes 102a become brighter.

Figure 15:
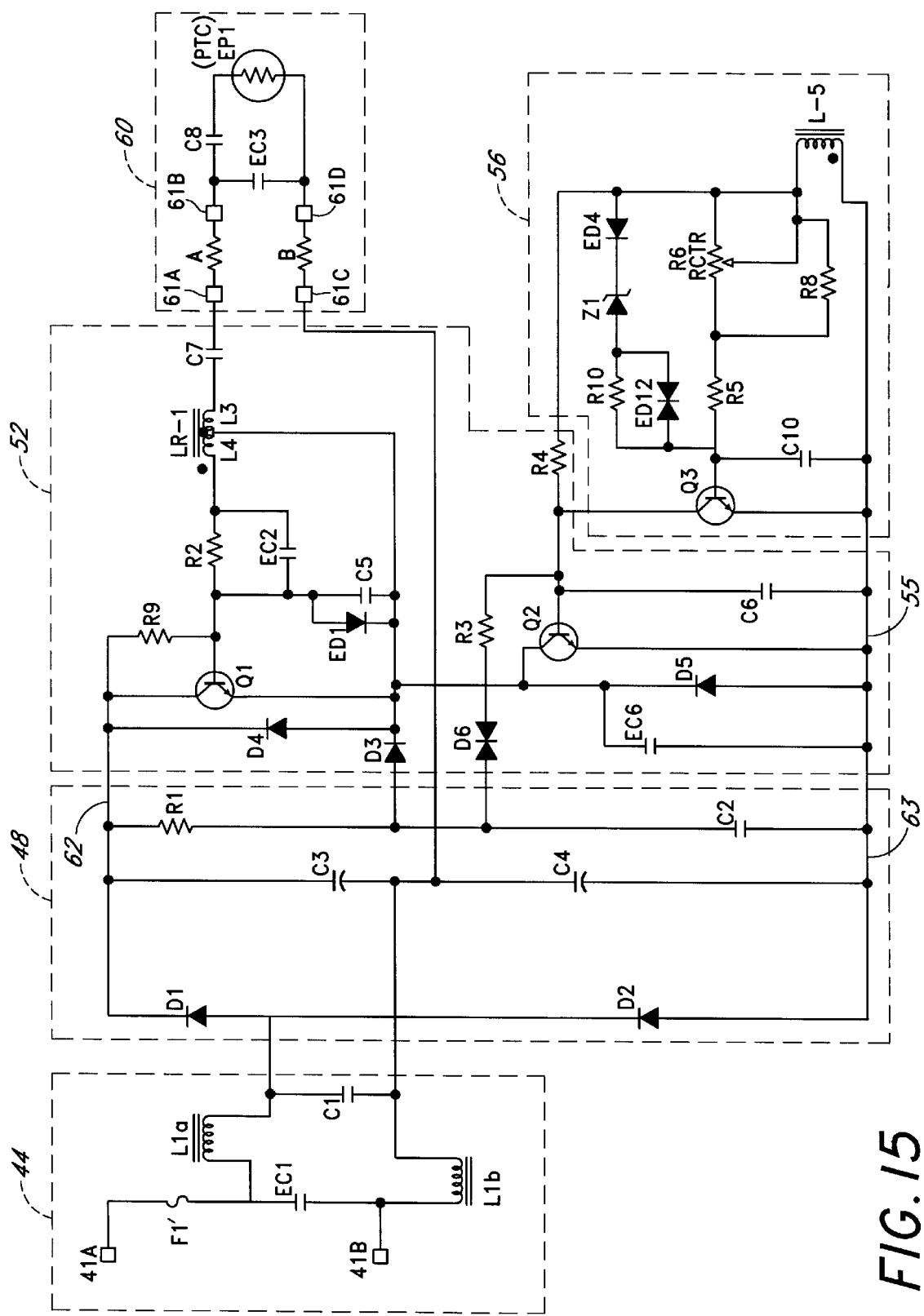
FIG. 15 is a schematic circuit diagram of a second embodiment of the dimmable ballast circuit of FIG. 11.

The Ballast Circuit of FIG. 15

FIG. 15 represents an embodiment of FIG. 11 for use in conjunction with a three way dimmer switch. As described below, certain changes have been made in the circuit of FIG. 11 to minimize the number of components used in the ballast circuit and to optimize performance when used with a three way dimmer switch.

In the EMI stage of the circuit, a capacitor EC1 has been added between the neutral line input 41B and the junction between the fuse F1 and the input inductor L1a. The addition of this capacitor allows high frequency components of the line signal to be filtered out improving the filtering characteristics of the EMI circuit.

In the resonant circuit stage 52, a capacitor EC2 has been added in parallel with R2. The capacitor EC2 provides additional base current to the base of transistor Q1. This additional current allows for quicker switching times. In addition to the capacitor, a diode ED1 has been added in parallel to C5. The anode of diode ED1 is connected to the base of transistor Q1 and the cathode of ED1 is connected to the emitter of transistor Q1. Diode ED1 helps to keep the switching times of Q1 constant despite changes in temperature.

In the lamp load stage 60 of FIG. 15, a PTC device, positive temperature coefficient device, EP1 and a capacitor EC3 have been added to the circuit of FIG. 11. The PTC device has the operating characteristic that at low temperatures, the PTC has very low resistance and at high temperatures, the PTC device has a very high resistance.

The PTC device is connected in series with the capacitor C8. The capacitor C8 and the PTC together are connected across terminals 61B and 61D of the load. An additional capacitor EC3 has also been added across terminals 61B and 61D. When a fluorescent lamp is initially turned on, additional voltage is needed to start the lamp. This additional charge is built up on the parallel combination of C8 and EC3. When the PTC is cool i.e. when the ballast is first energized, the PTC acts as a short circuit. As the PTC heats up however, the PTC device acts as an open circuit. As a result, the capacitor C8, which is then no longer needed is effectively removed from the circuit by the open circuit PTC device.

In the dimmer control stage 56 of FIG. 15, a diac ED12 and a diode ED4 have been added to the circuitry and the circuit reconfigured. The diac ED12 is placed in parallel with R10 which in turn is connected to the anode of zener diode Z1. The cathode of ED4 connected to the cathode of zener diode Z1. The anode of ED4 is connected to one end of inductor L5. The resistor R10 is no longer directly connected to the neutral line and instead is connected at one end to the anode of Z1 and at the other end to the base of transistor Q3.

The dimmer control circuit automatically reduces the power current delivered to the fluorescent lamp as the lamp begins to fail. As the fluorescent lamp begins to fail, the resistance of the lamp increases and thus the voltage across the lamp increases. The increase in voltage across the lamp results in an increase in voltage across the inductor L3, and because L3 is mutually coupled to L5, the voltage across L5 also increases. The increased voltage across L5 causes zener diode Z1 to break down and diac D12 to turn on. The flow of current into the base of transistor Q3 causes Q3 to turn on which in turn switches Q2 off. With Q2 off, the circuit is in the maximum dimmed condition and helps prevent overload to the fluorescent lamp load.

In the embodiment shown in FIG. 15, the value of the components are as follows:

In the EMI stage 44, the values are: F1' is a 2 Amp fuse, L1a is a 1.1 mH inductor with 120 turns, L1b is a 120 turn inductor mutually coupled with L1a, EC1 and C1 are both 0.1 μF capacitors.

In the rectification and amplification stage 48, the values are: D1 and D2 are both 1N4005 diodes, C3 and C4 are both 33 μF capacitors, C2 is a 0.1 μF capacitor and R1 is a 470 KΩ resistor In the active resonant circuit stage 52, the values are as follows: D3 is a 1N4005 diode, ED1 is a 1N4148 diode, R9 is 470 KΩ, R2 is 62Ω L3 is 1.55 mH with 120 turns, L4 has 4 turns and is mutually coupled to L3, C7 is 0.033 μF, C5 is 0.1 μF, EC2 is 0.01 μF, R4 is 62Ω, R3 is 47Ω, EC6 is 330 μF, C6 is 0.1 μF, transistors Q1 and Q2 are both BUL45 transistors.

In the load stage 60, the component values are EC3 is 0.0033 μF, C8 is 0.01 μF and EP1 is a PTC rated at 0.6KΩ.

In the control stage 56, the component values are: C10 is 0.01 μF, R5 is 330Ω, R8 is 2 KΩ, R6 is a variable resistor of 2 KΩ, R10 is 620Ω, zener diode Z1 is a 1N5237 diode with an approximately 8.2 volt breakdown voltage, ED4 is a 1N4148 diode, transistor Q3 is a 2N3904 transistor, and L5 is a 4 turn inductor mutually coupled with inductor L3.

Figure 18:
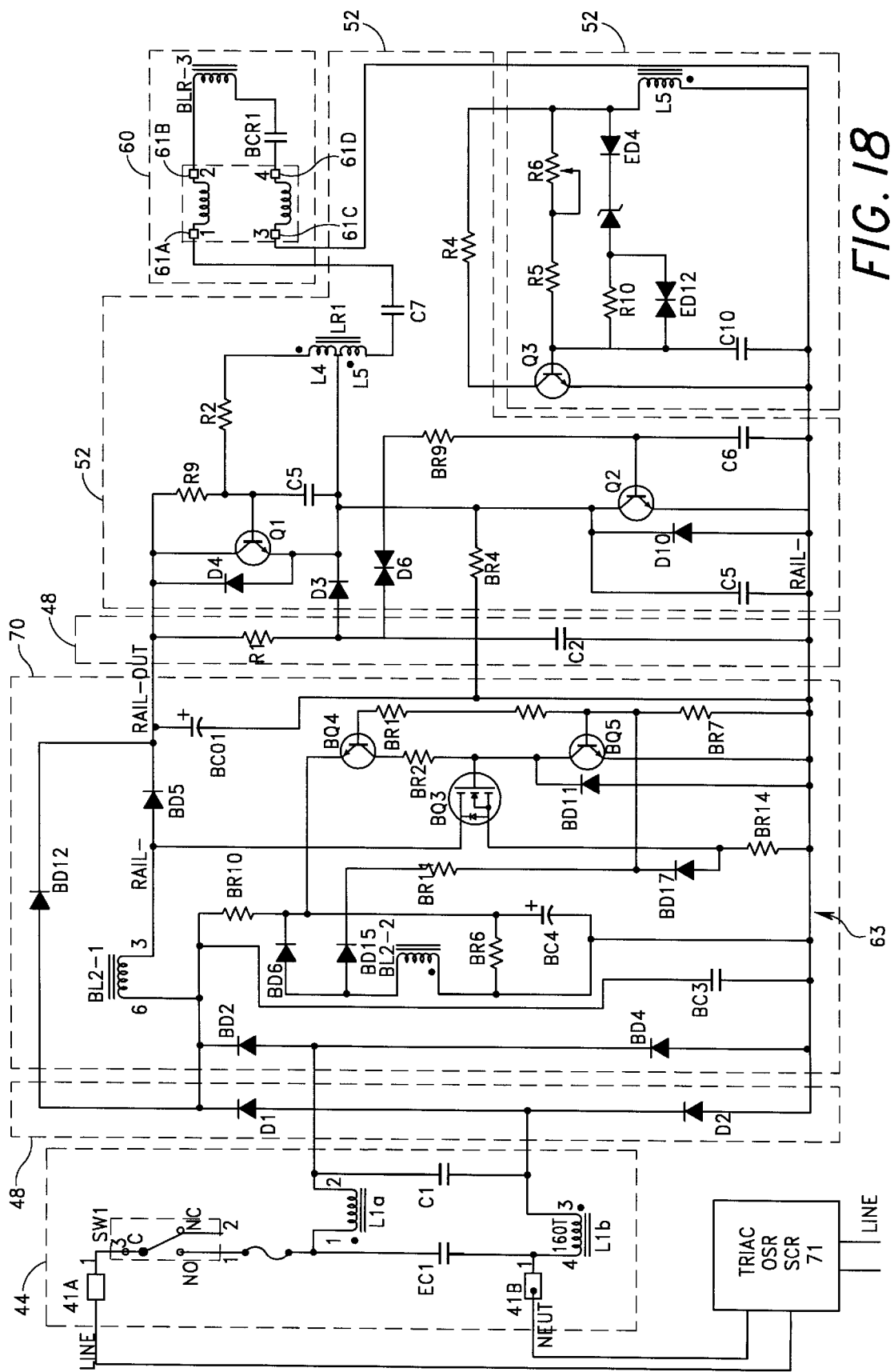
FIG. 18 is a schematic circuit diagram of a different embodiment of the circuit of FIG. 15. The circuit shown in FIG. 18 can accommodate the output from a triac or a SCR device.

High Performance Ballast Circuit Compatible with the Output from a Triac or SCR FIG. 18 is a schematic representation of the ballast circuit of FIG. 15 adapted so that a compact or a regular fluorescent lamp connected at the load will dim appropriately depending on the setting of a triac or SCR dimmer control.

Triac and SCR dimmer controls are well known in the art for use as dimmer controls for incandescent lamps in both homes and commercial buildings. Heretofore it has, however, not been feasible to utilize the output voltage from these devices for controlling either regular fluorescent tubes or compact fluorescent bulbs because of excessive fluctuating currents and other problems associated therewith.

In FIG. 18, a switch SWI has been added to allow the ballast to be turned on or off from within the circuit. Significantly larger inductors have also been used for inductor L1a. These inductors are approximately 50 mH. The large inductances reduce the effect of abrupt changes in current output that are typical of conventional SCR and triac lamp dimming devices.

In FIG. 18, the variable resistor R6 of FIG. 15 has been retained to provide the user with a second method of dimming the fluorescent light output. In a simpler embodiment of the ballast circuit described in FIG. 18, the variable resistor may be either removed or replaced with a single value resistor.

In FIG. 18, a booster circuit 70 has replaced the two capacitors C3 and C4 of FIG. 15. Booster circuit 70 compensates for the line input signal provided by the triac or SCR dimmer 71. The addition of the booster stage 70 cleans up this signal and significantly reduces the total harmonic distortion.

Booster Stage 70

The booster circuit contains diodes BD2 and BD4 connected in series. The pair of diodes, BD2 and BD4 are connected in parallel with the original diodes D1 and D2. The inductor L1a connects one input line to the anode of BD2 and the cathode of BD4. The inductor L1b connects the neutral input line to the cathode of D2 and the anode of D1. The cathode of D1 and BD2 connect to the booster rail BR62. Together diodes D1, D2, BD2 and BD4 form a full bridge.

The booster rail BR62 is connected to the main positive rail 62 by an overflow diode BD12. The anode of diode BD12 is connected to the booster rail and the cathode is connected to the main rail 62. During transients, the overflow diode allows current to flow directly to the main rail 62 bypassing most elements of the booster circuit.

A storage inductor BL2-1 is connected to the booster rail. The opposite end of the inductor is connected to the anode of diode BD5. The cathode of diode BD5 is connected to the main positive rail 62. A storage capacitor BCO1 is connected from the positive main rail 62 to the negative rail 63. Another capacitor BC3 connects the booster rail to the negative main rail 63. Capacitor BC3 decouples the bridge from the booster circuit at high frequencies by preventing high frequency from the booster from leaking over the bridge. The capacitor also helps reduce the ripple on the booster rail.

The active portion of the booster circuit contains three transistors. The drain of a MOSFET BQ3 is connected to the booster rail BR62. The source of the MOSFET BQ3 is connected to a resistor BR14, an opposite end of which is connected to the negative rail 63. The gate of MOFSET BQ3 is connected to the collector of an NPN BJT transistor BQ5. A diode BD11 is connected across the base emitter of BQ5. The cathode of the diode is connected to the collector of BQ5 and the anode of the diode is connected to the emitter of transistor BQ5.

The collector of transistor BQ5 is connected to a resistor BR2, the opposite end of which is connected to the collector of a pnp BJT transistor BQ4. The emitter of pnp transistor BQ4 is connected to the booster rail through resistor BR10.

The base of transistor BQ5 is connected to the negative rail 63 through resistor BR7. A series combination of resistor BR1 and BR3 connect the bases of transistor BQ4 and BQ5, with BR1 connected to the base of BQ4 and BR3 connected to the base of BQ5. Resistor BR4 connects the junction of BR1 and BR3 with the collector of BQ2.

The components of the booster stage described are as follows: BD2 and BD4 are 1N4007 diodes. Transistor BQ4 is a 2N3906, transistor BQ5 is a 2N3904 and MOSFET BQ3 is a IRF730. Diode BD11 is a 1N4148 diode. Inductor BL2-1 is a 1.6 mH inductor with 230 turns and is mutually coupled to a inductor BL2-2 which is a 1.6 mH inductor with 10 turns. Resistor BR4 is 300 KΩ, resistor BR1 is 10 KΩ, resistor BR2 is 47Ω, resistor BR3 is 100 KΩ, and resistor BR7 is 20 KΩ. Capacitor BCO1 is a 47 µF capacitor.

Mode of Operation

The MOSFET transistor BQ3 is driven by BJT transistors BQ4 and BQ5 in a "push-pull" arrangement. Transistors BQ4 and BQ5 in turn are controlled by BJT transistor Q2. Thus, BJT Q2 and MOSFET BQ3 "handshake". If other elements of the circuit are not set to override the handshake arrangement, when transistor Q2 is switched on, transistor BQ4 is turned on and transistor BQ5 is turned off. Thus, MOSFET BQ3 is switched on. When transistor Q2 switches off, MOSFET BQ3 switches off.

When BQ3 is on, current flows from inductor BL2-1 through the MOSFET BQ3 and resistor BR14. Thus when BQ3 is on, energy is taken from the line and stored in the inductor BL2-1.

When Q2 switches off, MOSFET BQ3 switches off almost immediately. When BQ3 switches off, the energy stored in inductor BL2-1 is released. The energy from BL2-1 is transferred to BCO1. While Q2 is off, the current from BL2 is superimposed with the current from the bridge circuit.

Thus, over the entire operating frequency range, the MOSFET transistor BQ3 helps to maintain a more constant supply of power at the rail or line by removing energy from the line when Q2 is on and adding the removed energy when the transistor Q2 is off. Thus the booster circuit helps provide a flat DC rail voltage across BCO1 which helps prevent ripple on the lamp current. Sufficient sustaining current is provided even if the source of the current is an output from a triac. The Boosters draw of current over the entire range of the SCR control also enables the circuit to provide sustaining current from the SCR and prevent flickering of the fluorescent lamp. The boost circuit thus provides both boost compensation and THD (Total harmonic distortion) compensation.

Overflow diode BD12 provides an overflow path for current when there are transient inputs.

The Bootstrap Configuration

The bootstrap configuration accomplishes two objectives, it overrides the "handshake" arrangement of Q2 and turns on BQ5 effectively turning off BQ3 when continuous operation would be stressful to BQ3. Thus although BQ3 is a slave to Q2, BQ3 may be made to miss some cycles. The bootstrap configuration also provides power to the transistor BQ4.

The booster rail is connected to a resistor BR10 which is connected in series to the positive end of capacitor BC4. The opposite end of capacitor BC4 is connected to the main negative rail 63. A resistor BR6 is connected in parallel with capacitor BC4. The negative main rail is also connected to inductor BL2-2. The opposite end of inductor BL2-2 is connected to the anode of diode BD6. The cathode of BD6 is connected to the positive end of capacitor BC4. The positive end of capacitor BC4 is also connected to the emitter of npn transistor BQ4.

The anode of BD6 is connected to the anode of diode BD15. The cathode of BD15 is connected to a resistor BR11 which is connected to the base of transistor BQ5. A feed forward resistor BR14 connects the source of MOSFET BQ3 to the negative main rail 63. The anode of a feed forward diode BD17 is also connected to the source of MOSFET BQ3. The cathode of feed forward diode BD17 is connected to the base of BQ5.

The values of a the elements in one embodiment of the bootstrap circuit are as follows: Diode BDG is a UF4005, Diodes BD15, BD11 and BD17 are 1N4148 diodes. Inductor BL2-2 as described is a 1.6 mH inductor with 10 turns mutually coupled to inductor BL2-1. Resistor BR6 is a 20 KΩ resistor, BR10 is 100 KΩ, and BR11 is 1 KΩ. The feed forward resistor BR14 is 1Ω (?). BC4 is a 100 µF capacitor and BC3 is a 0.1 µF capacitor.

Mode of Operation of the Bootstrap Circuit

The bootstrap circuit described provides power for the pnp transistor BQ4 and occasionally, when the MOSFET is being driven too hard overrides the described "handshaking" arrangement to turn off the MOSFET.

The power source for transistor BQ4 is provided by the current from the bridge circuit flowing through the resistor BR10. This current charges the capacitor BC4 which allows the transistor BQ4 to start operating when the voltage across BC4 reaches around seven volts.

The inductor BL2-2 is mutually coupled to inductor BL2-1 and thus also provides power for the booster circuit. The energy provided by inductor BL2-2 is rectified by diode BD6 and also charges capacitor BC4.

Diode BD15 and resistor BR11 connect the inductor BL2-2 to the base of transistor BQ5. Thus when the inductor BL2-1 is fully energized, the mutually coupled inductor BL2-2 is also fully energized. When fully energized, current from BL2-2 flows through BD15 and BR11 to the base of BQ5 effectively turning on BQ5. Turning on BQ5 turns off the MOSFET BQ3 preventing stress and failure of the MOSFET. Controlling the MOSFET by this method overrides the slave relationship with Q2, so that MOSFET BQ3 may miss some cycles. This prevents continuous operation of BQ3 which is stressful to BQ3.

Diodes BD17 and BR14 provide a current feed forward for the Booster circuit to again limit the cycle time of BQ3. When the MOSFET BQ3 is driven such that the current leaving the MOSFET is sufficient to cause the voltage across BR14 to exceed about 1.4 volts (the approximate forward voltage drop across BD17 combined with the base emitter voltage drop across transistor BQ5) then the feed forward diode BD17 will conduct which turns transistor BQ5 on. The turning on of BQ5 turns off MOSFET BQ3 which again limits the on time of BQ3.

The Output Voltage Stage 60

The output stage 60 of FIG. 18 includes a series connected inductor BLR-3 and capacitor BCR1, this series circuit being connected in parallel with the fluorescent lamp across terminals 61B and 61D. An important feature of this output stage is that it maintains a substantially constant voltage across the lamp despite large frequency variations in the resonant frequency.

The inductor BLR3 is magnetically coupled as part of the resonating inductor LR-1 and L-5. Thus the capacitor BCR1 is connected with resonating inductor LR-1, though BLR3. BLR3 is wound in an opposite directions as LR-1. The opposite polarity of ELR3 assures that the voltage across BLR3 adds with the voltage across the resonating capacitor BCR1 to maintain a constant voltage across the lamp load despite large resonant frequency variations.

The voltage across the serial combination of BLR3 and BCR1 is relatively constant because as the frequency of signal at the load goes up, the voltage across BLR3 increases. This increase compensates for the dropping voltage across BCR1. The current is also stabilized because the lower impedance of the capacitor at high frequency is compensated for by the higher impedance of the inductor at high frequency.

Another important feature of this output stage circuit is that it assists restriking the fluorescent lamp when the dimmer control is set at a maximum dimming setting.

This arrangement helps to minimize the ripple on the rail voltage that sometimes results as a result of triac operation. The reduction of the ripple effect using the complex loaded series resonant circuit enables the value of BCO1 to be reduced.

Another major benefit of the complex loaded series resonant circuit is that it assists the restriking of the lamps at low light levels. As previously discussed, by reversing the polarity of BLR3, the voltage across BLR3 and BCR1 adds together. In a standard circuit, the voltage across the resonating inductor and the resonating capacitor are 180 degrees out of phase. By adding 180 degrees to the inductor, the resonating inductor and the resonating capacitor are brought back into phase. The addition of the voltages across the series inductor capacitor combination allows restarting of the lamp at lower light levels.

In one embodiment of the load, BLR3 is a fifty turn inductor mutually coupled to LR-1 which is a 150 turn inductor and capacitor BCR1 is a 0.0033 $\mu$F capacitor.

Other Applications for Booster Circuit 70 and Output Stage 60

The improved output stage 60 and booster circuit 70 shown in FIG. 18 are not limited to only the circuit shown. Rather these stages are applicable to the other circuits described in this application. For example, the benefits of this output stage 60 are applicable to any of the prior circuits including the circuits of FIGS. 3, 4, 10,11, 15 and 16. The booster circuit 70 may be also incorporated into any of these circuits to provide an alternative form of power correction.

Ballast Circuit for the Three Way Switch

Figure 16:
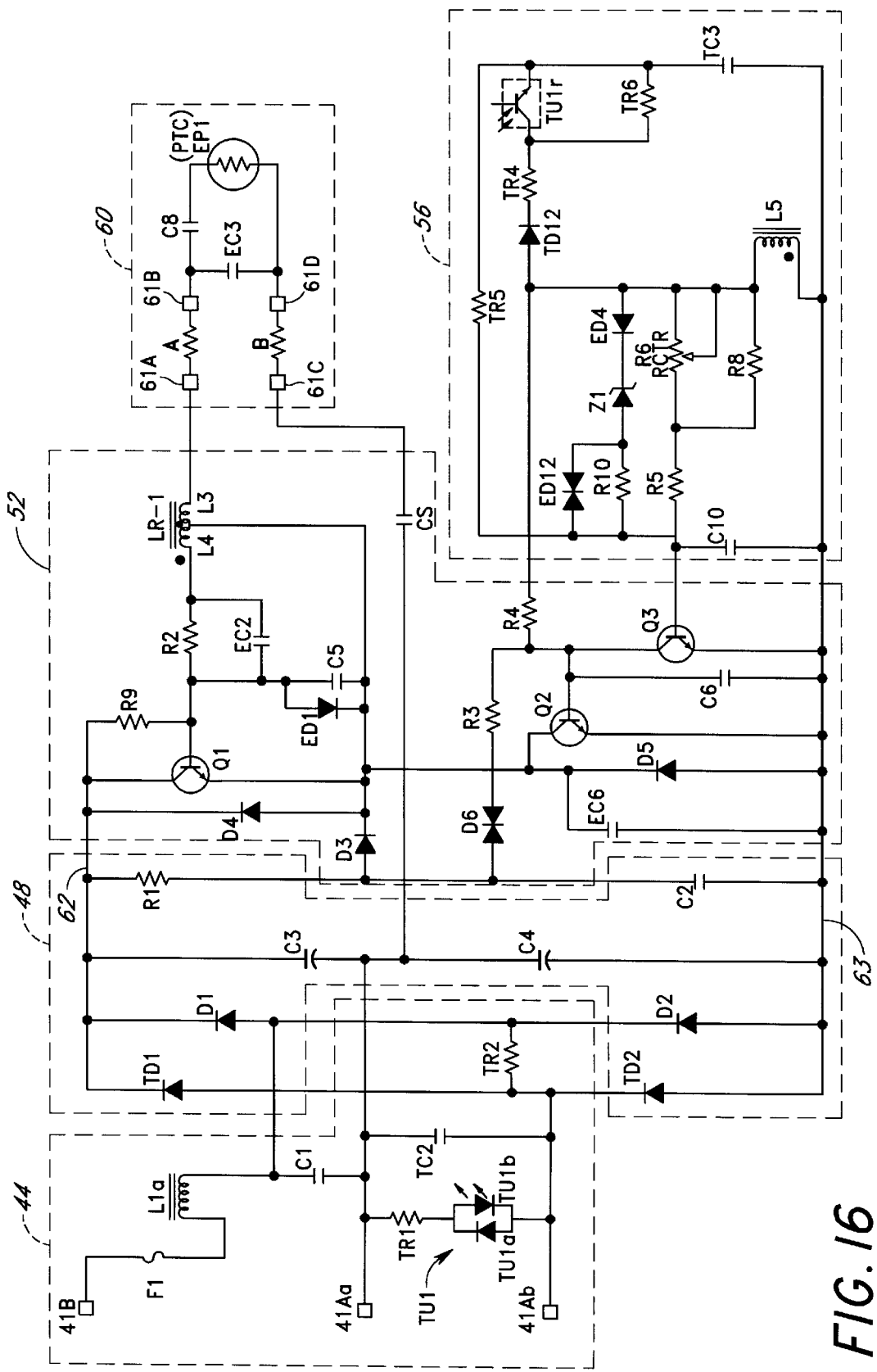
FIG. 16 is a schematic circuit diagram of the circuit of FIG. 15 modified to accommodate a three position switch to provide three discrete intensity settings thereof.

FIG. 16 is a schematic representation of the ballast circuit of FIG. 15 adapted so that a compact fluorescent lamp connected at the load will dim appropriately depending on the setting of a three way switch.

Figure 17:
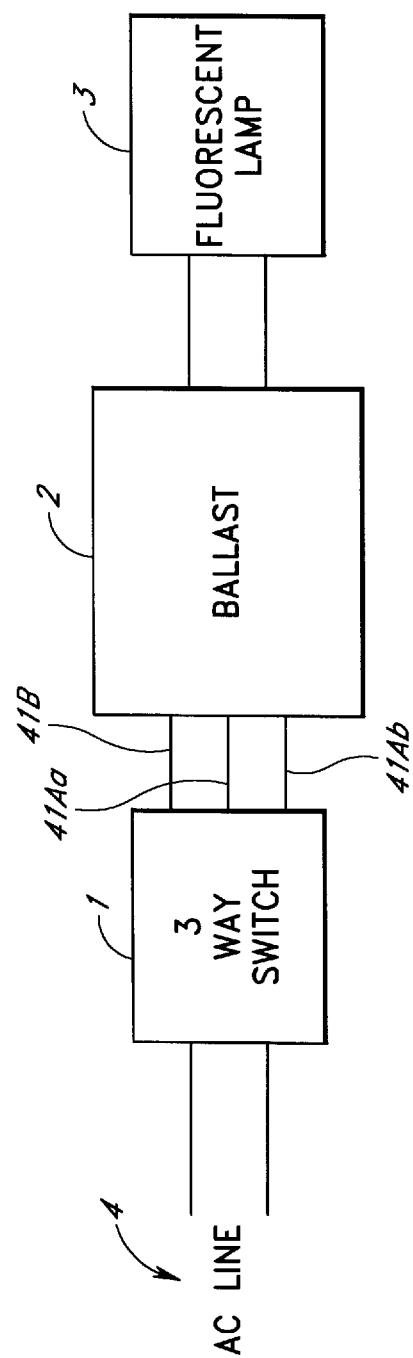
FIG. 17 is a block diagram of the connections between a three way switch and a ballast and a ballast and a fluorescent lamp.

In a normal three way incandescent light switch, pictured in FIG. 17, three output wires are available. One of the wires is neutral, a first wire is connected to a low wattage filament, and a second wire is connected to a high wattage filament. In an off state, none of the lines are energized. In a first state, the light output of the lamp is at a minimum because only the first wire is energized. In a second state, the lamp output is in a medium brightness stage because only the second wire is energized and thus only the higher wattage filament is used. In a third stage, the light output of the lamp is at a maximum because both wires are energized and thus both filaments are in use.

Conventional three way light dimmer switches are ubiquitous and used, for example in a number of table lamps for driving a screw in 50-100-150 watt incandescent light bulb. A feature of this invention is that the same lamp base may be used to drive a compact fluorescent light driven by the ballast circuit of FIG. 17.

The circuit in FIG. 16 adjusts the power delivered to a compact fluorescent light bulb such that three discrete levels of brightness are output depending on which of the three input lines are energized. In the preferred embodiment at least one of the discrete intensity levels is provided by reducing the rail voltage and at least one other discrete intensity level is provided for by adjusting the amount of asymmetry in the described active stage. Thus the circuit alters the fluorescent light output both by sending the information as to which line or lines are energized to the dimming control stage which adjusts the switching time of Q2 and by altering the rail voltage. Within the three discrete light intensities the output intensity of the fluorescent bulb may be further adjusted by incorporating an optional variable resistor so that the end user can further vary light output. For the analysis that follows, it is assumed that the variable resistor R6 is in the maximum intensity position.

EMI filter stage (Input stage) for the Three Way

The input stage of FIG. 16 accommodates three line inputs instead of two. The neutral line input 41B is connected to a fuse F1 which is connected in series with the inductor L1a. The opposite end of inductor L1a is connected to one end of capacitor C1, and the anode of diode D1.

The second line input 41Ab is connected to a photo-diode or opto-coupler transmitter TU1. The photodiode or opto-coupler transmitter consists of a pair of diodes connected in parallel. The anode of the regular diode TU1a is connected to the cathode of a light emitting diode TU1b. Both of these terminals connect to the input 41Ab. The anode of TU1b and the cathode of TU1a connect to one end of the resistor TR1, the opposite end of which is connected to the input line 41Aa. A capacitor TC2 also connects 41Aa and 41Ab and is in parallel with the series combination of TR1 and TU1.

The input line 41Ab is also connected to the cathode of diode TD2, the anode of TD1 and one end of resistor TR2.

The opposite end of resistor TR2 is connected to the cathode of D2 and the anode of D1. Capacitor C1 connects the anode of D1 with the second line input 41Aa.

Diodes TD1 and TD2 are connected in series between the positive rail 62 and the negative rail 63.

In the embodiment shown, the values of the elements in the input stage 44 are as follows: F1 is a 2 amp fuse, L1a is 1.1 mH inductor with 140 turns, capacitors C1 and TC2 are 0.1 µF, TU1 is a H11AA1 opto-coupler transmitter, TR1 is 33 kΩ, TR2 is 51 kΩ, TD1 and TD2 are 1N4005 diodes.

The Dimming Control Stage

In the control stage 56 of FIG. 16, the variable resistor R6 has been left in the circuit. Thus the variable resistor can be used in addition to the new elements that are added to adjust the light intensity of the compact fluorescent lamp. It will be understood that if only the three discrete levels of light intensity are desired, then the variable resistor R6 can be deleted.

In the control stage 56 of FIG. 16, a resistor TR5 in series with a capacitor TC3 connects the base of transistor Q3 to the negative rail line 63. In parallel with TR5, is a series combination of a diode TD12, a resistor TR4 and a opto-coupler receiver TU1r. The anode of TD12 is connected to the base of transistor Q3 and the cathode is connected to one end of resistor TR4. The collector of TU1r is connected to the opposite end of resistor TR4 and the emitter of TU1r is connected to the junction between resistor TR5 and capacitor TC3. A resistor TR6 is connected from the emitter of TU1r to the collector of TU1r.

In the embodiment shown, the value of the elements in the control stage 60 are as follows: resistor TR5 is 3 kΩ, TR4 is 620Ω, TR6 is 10 KΩ, TU1r is the receiving end of the H11AA1 photo-coupler or opto-coupler, TC3 is a 33 µF capacitor, TD12 is a 1N4148 diode. Among the elements that were also shown in FIG. 15, R10 is a 470Ω resistor, R5 is 330Ω, R8 is 2 KΩ and R6 is a variable resistor of 2 KΩ. The capacitor C10 is a 0.01 µF capacitor and inductor L5 is a 4 turn inductor mutually coupled to L3. Zener diode Z1 is a 1N5237 and ED4 is a 1N4148 diode.

Some of the component values in the other stages have also changed from the embodiment shown in FIG. 15. The values of the components in the embodiment of FIG. 16 are as follows:

In the voltage rectification and amplification stage: D1, D2, TD1 and TD2 are all 1N4005 diodes, C3 and C4 are both 33 µF capacitors, and C2 is a 0.1 µF capacitor. Resistor R1 is 470 KΩ.

In the active oscillator stage 52: diac D6 is a HT-32, D3 is a 1N4007, and ED1 is a 1N4148 diode. Transistors Q1 and Q2 are both BUL 45 transistors, and transistor Q3 is a 2N3904 transistor. Resistor R9 is 470 KΩ, R2 is 62Ω, R3 is 47Ω, and R4 is 62Ω. Capacitor EC2 is 0.1 µF, CS is 0.1 µF, EC6 is 0.001 µF, C6 is 0.1 µF and CS is 0.1 µF. Inductor L3 is a 1.55 mH inductor with 190 turns, L4 is a 4 turn inductor mutually coupled to inductor L3

In the load stage 60, the capacitor EC3 is 0.0033 µF and C8 is 0.01 µF. The PTC device is a 0.6 KΩ device.

Mode of Operation

The Second State, Medium Intensity Light

The intensity of light output by the fluorescent lamp depends on which line is energized.

In the second state, or medium light intensity state, line 41Ab is energized and line 41Aa is off. When 41Ab is on, TD1 conducts during the positive half cycle, and TD2 conducts during the negative half cycle. Thus the diode TD1 allows the capacitor C3 to charge during the peak of the positive half cycle and diode TD2 allows capacitor C4 to charge during the peak of the negative half cycle. As previously described, the sum of the voltage across C3 and C4 are supplied to the load. The voltage amplification performed by the illustrated amplification stage is approximately 2:1.

When line 41Ab is energized, a small current also flows through TR2. The value of this current is approximately 2 mA. This small current is sufficient to charge TC2 and generate a small current through TR1 and TU1. This current is sufficient to turn on the opto-coupler transmitter TU1.

The signal from TU1 is received by the receiving transistor of the opto-coupler TU1r as shown in the control stage 56 of FIG. 16. The signal from TU1 turns on the opto-coupler receiver TU1r which charges TC3. As TC3 is charged, current flows through resistor TR5 and the base voltage of transistor Q3 rises turning Q3 on. When Q3 is on, the base transistor Q2 is kept off. As in the circuit of FIG. 11, when transistor Q2 is off, the frequency period is shortened and less power is delivered to the load. In this energized state, approximately 50% of full light intensity is delivered by the fluorescent bulb.

The First State, Minimum Intensity Light

In the first state, where the light output of the lamp is at a minimum, line 41Aa is energized and line 41Ab is off. The input line 41Aa is connected to the capacitors C3 and C4. Diodes D1, D2, TD1 and TD2 now act as a full bridge. Thus when only line 41Aa is energized, no voltage amplification takes place. The reduction in light intensity resulting from the reduction in rail voltages is approximately 60% of the total light output.

When line 41Aa is energized, the residual current travels through TR1, TU1 and through TR2 and L1a to the neutral terminal. This residual current turns on the optical coupler TU1 slightly resulting in a charging of TC3. The current through TR5 charges capacitor C10 and turns on transistor Q3 which turns off transistor Q2. Because the residual current through the opto-coupler transmitter TU1 is small, the current from opto-receiver TR1r is less than the current provided by the opto-receiver when the three way switch is set at the first setting. Thus, Q3 will not always be on, instead, the on and off time of Q3 will be determined by the resistor and capacitor charge and discharge times. Compared to a symmetric duty cycle, the net reduction in light output that results from the change in duty cycle from the active stage operating symmetrically (Q3 always off) is approximately 20% of the total light output.

Thus in the minimum light output stage, the total reduction in light intensity from maximum output is 80%.

Both Line 41Aa and Line 41Ab Energized Maximum Light Output

In the third switch position, both 41Aa and 41Ab are energized. The amplification of the rail voltages will again be two to one as the voltages at the rail are determined by the input line voltage and the voltage drop across diode TD1 in the positive half cycle and across TD2 in the negative half cycle. Thus the rail voltages provide maximum power to the lamp.

Likewise, the dimmer control circuit 56 also will provide maximum power to the lamp. When line 41Aa and 41Ab are both energized, the photo-coupler or opto-coupler transmitter TU1 is shorted out of the circuit. Since the opto-coupler transmitter is off, the opto-coupler receiver TU1r will also remain off, and thus TC3 will not be charged. Assuming that the variable resistor R6 has been left in full on position, the resistor Q3 will be kept off because the base emitter voltage will be less than the transistor Q3's turn on voltage. With Q3 kept off, Q2 will be turned on and will deliver the full duty cycle or the maximum available power to the load The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A method of adapting an output from a conventional three-way switch in a lamp socket for use by a fluorescent lamp to provide at least three discrete stages of light corresponding to a first setting, a second setting, and a third setting of said three-way switch, wherein in said first setting of said three-way switch an input voltage is provided to a first power input to said fluorescent lamp, in said second setting of said three-way switch said input voltage is provided to a second power input to said lamp, and in said third setting of said three-way switch said input voltage is provided to both said first and said second power inputs to said lamp, the method comprising the steps of:

sensing whether said input voltage is provided on said first power input, on said second power input, or on both power inputs;

rectifying said input voltage to create a first source voltage when said input voltage is provided only on said first power input, said first source voltage providing a corresponding first controlled current, said first controlled current applied to said fluorescent lamp to cause said fluorescent lamp to have a first brightness level;

generating a voltage approximately double said input voltage to create a second source voltage when said input voltage is provided on said second power input, said second source voltage providing a corresponding second controlled current;

adjusting said second controlled current to create a third controlled current when said input voltage is provided only on said second power input;

applying said second controlled current to said fluorescent lamp when said input voltage is provided on both said first power input and said second power input to cause said fluorescent lamp to have a second brightness level which is greater than said first brightness level; and applying said third controlled current to said fluorescent lamp when said input voltage is provided only on said second power input to cause said fluorescent lamp to have a third brightness level which is between said first brightness level and said second brightness level.

2. The method of claim 1, wherein the adjusting step changes the pulse width of said second controlled current.

3. The method of claim 1, wherein the adjusting step changes the frequency of said second controlled current.

4. A ballast for adapting an output from a conventional three-way switch in a lamp socket for use by a fluorescent lamp to provide at least three discrete stages of light corresponding to a first setting, a second setting, and a third setting of said three-way switch, wherein in said first setting of said three-way switch an input voltage is provided to a first power input to said fluorescent lamp, in said second setting of said three-way switch said input voltage is provided to a second power input to said lamp, and in said third setting of said three-way switch said input voltage is provided to both said first and said second power inputs to said lamp, said ballast comprising:

a rectification and voltage doubling stage which receives said input voltage, wherein said rectification and voltage doubling stage rectifies said input voltage to create a first source voltage when said input voltage is provided only on said first power input, said first source voltage providing a first controlled current, wherein said first controlled current causes said fluorescent lamp to have a first brightness level, said rectification and voltage doubling stage increasing said input voltage to create a second source voltage when said input voltage is provided on only said second power input alone, said rectification and voltage doubling stage also increasing said input voltage to create said second source voltage when said input voltage is provided on both said first power input and said second power input, said second source voltage providing a second controlled current, wherein said second controlled current causes said fluorescent lamp to have a second brightness level when said input voltage is provided on both said first power input and said second power input wherein said second brightness level is greater than said first brightness level; and an active stage which adjusts said second controlled current to create a third controlled current if said input voltage is provided only on said second power input alone wherein said third controlled current causes said fluorescent lamp to have a third brightness level, wherein said third brightness level is between said first brightness level and said second brightness level.

5. The ballast of claim 4, wherein the active stage changes the pulse width of said second controlled current.

6. The ballast of claim 4, wherein the active stage changes the frequency of said second controlled current.

7. A ballast for adapting an output from a conventional three-way switch in a lamp socket for use by a fluorescent lamp to provide at least three discrete stages of light corresponding to a first setting, a second setting, and a third setting of said three-way switch, wherein in said first setting of said three-way switch an input voltage is provided to a first power input to said fluorescent lamp, in said second setting of said three-way switch said input voltage is provided to a second power input to said lamp, and in said third setting of said three-way switch said input voltage is provided to both said first and said second power inputs to said lamp, said ballast comprising:

a rectification and voltage doubling stage which receives said input voltage, wherein said rectification and voltage doubling stage rectifies said input voltage to create a first source voltage when said input voltage is provided only on said first power input and increases said input voltage to create a second source voltage when said input voltage is provided on said second power input; and an active stage which receives one of said first source voltage and said second source voltage, wherein said active stage creates a first output current from said first source voltage, wherein said active stage creates a second output current from said second source voltage when said input voltage is provided on both said first power input and said second power input, wherein said active stage creates a third output current from said second source voltage when said input voltage is provided only on said second power input, wherein said first output current causes said fluorescent lamp to have a first brightness level, said second output current causes said fluorescent lamp to have a second brightness level and said third output current causes said fluorescent lamp to have a third brightness level, and wherein said second brightness level is greater than said first brightness level and said third brightness level is between said first brightness level and said second brightness level.

8. The ballast of claim 7, wherein the active stage changes the pulse width of said second output current to create said third output current.

9. The ballast of claim 7, wherein the active stage changes the frequency of said second output current to create said third output current.

10. A ballast for adapting an output from a conventional three-way lamp socket switch for use by a fluorescent lamp to provide at least three discrete stages of light corresponding to a first setting, a second setting, and a third setting of said three-way switch, wherein in said first setting of said three-way switch an input voltage is provided to a first power input to said fluorescent lamp, in said second setting of said three-way switch said same input voltage is provided to a second power input to said lamp, and in said third setting of said three-way switch said same input voltage is provided to both said first and said second power inputs to said lamp, said ballast comprising:

a rectification and voltage doubling stage which receives said input voltage, wherein said rectification and voltage doubling stage rectifies said input voltage to create a first source voltage when said input voltage is provided only on said first power input and increases said input voltage to create a second source voltage when said input voltage is provided on said second power input; and an active stage which receives one of said first source voltage and said second source voltage, wherein said active stage creates a first output current having a maximum duty cycle from said first source voltage, wherein said active stage creates a second output current having a maximum duty cycle from said second source voltage when said input voltage is provided on both said first power input and said second power input, wherein said active stage creates a third output current by adjusting said second output current when said input voltage is provided only on said second power input, wherein said first output current causes said fluorescent lamp to have a first brightness level, said second output current causes said fluorescent lamp to have a second brightness level and said third output current causes said fluorescent lamp to have a third brightness level, and wherein said second brightness level is greater than said first brightness level and said third brightness level is between said first brightness level and said second brightness level.

11. A method of adapting an output from a conventional three-way incandescent lamp switch having a selectively energized first electrical contact and a selectively energized second electrical contact for use by a fluorescent lamp to provide at least three discrete stages of light, the method comprising the steps of:

connecting said first electrical contact to said fluorescent lamp to cause said fluorescent lamp to have a first brightness level when only said first electrical contact is energized;

connecting said second electrical contact to said fluorescent lamp to cause said fluorescent lamp to have a second brightness level which is greater than said first brightness level when only said second electrical contact is energized; and connecting both said first and second electrical contacts to said fluorescent lamp to cause said fluorescent lamp to have a third brightness level which is greater than said second brightness level when both said first and second electrical contacts are energized.

\* \* \* \* \*